(12) United States Patent
Tsuchiya

(10) Patent No.: US 10,343,318 B2
(45) Date of Patent: Jul. 9, 2019

(54) MOLDING SYSTEM PROVIDED WITH MOLDING MACHINE AND MOLDED ARTICLE REMOVAL DEVICE

(71) Applicant: FANUC CORPORATION, Yamanashi (JP)

(72) Inventor: Nobuatsu Tsuchiya, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 43 days.

(21) Appl. No.: 15/825,451

(22) Filed: Nov. 29, 2017

(65) Prior Publication Data

US 2018/0154565 A1    Jun. 7, 2018

(30) Foreign Application Priority Data

Dec. 2, 2016   (JP) ................................ 2016-234899

(51) Int. Cl.
    *B29C 45/42*      (2006.01)
    *B29C 45/76*      (2006.01)
    (Continued)

(52) U.S. Cl.
    CPC ........... *B29C 45/7626* (2013.01); *B25J 9/042* (2013.01); *B25J 9/1664* (2013.01);
    (Continued)

(58) Field of Classification Search
    CPC ............ B29C 45/42; B29C 2045/4266; B29C 2045/425; B29C 2045/4291; B29C 2045/4241; B29C 2045/4225
    See application file for complete search history.

(56) References Cited

U.S. PATENT DOCUMENTS 6,390,804 B1 * 5/2002 Akino ..................... B29C 45/42
                                                                 264/334
7,118,365 B2 * 10/2006 Shirahata ............ B29C 45/7626
                                                                  425/139

(Continued)

FOREIGN PATENT DOCUMENTS

JP        6198687 A     7/1994
JP        1016022 A     1/1998

(Continued)

OTHER PUBLICATIONS

Untranslated Decision to Grant a Patent mailed by Japan Patent Office (JPO) for Application No. JP 2016-234899, dated Jul. 10, 2018, 3 pages.

(Continued)

*Primary Examiner* — Joseph S Del Sole
*Assistant Examiner* — Thu Khanh T Nguyen
(74) *Attorney, Agent, or Firm* — Fredrikson & Byron, P.A.

(57) ABSTRACT

A molding system capable of performing highly accurate work on a molded article with a molded article removal device. The molding system includes a molding machine, a molded article removal device capable of removing a master work installed in a mold of the molding machine, a measurement section configured to measure a position of the master work when the master work is removed by the molded article removal device, a displacement calculation section configured to calculate a difference between a reference position and a detected position of the master work measured by the measurement section as a displacement, and a correction section configured to, on the basis of the displacement calculated by the displacement calculation section, correct a work position for when the molded article removal device performs work on a molded article.

6 Claims, 20 Drawing Sheets

(51) Int. Cl.
*B25J 9/04* (2006.01)
*B25J 9/16* (2006.01)
*B29C 37/00* (2006.01)
*B29C 45/14* (2006.01)
*B25J 13/08* (2006.01)
*B25J 19/02* (2006.01)

(52) U.S. Cl.
CPC .... *B29C 37/0007* (2013.01); *B29C 45/14032* (2013.01); *B29C 45/4225* (2013.01); *B25J 13/086* (2013.01); *B25J 19/022* (2013.01); *B29C 2945/76795* (2013.01)

(56) References Cited

U.S. PATENT DOCUMENTS 7,364,423 B2 * 4/2008 Kalemba ............. B29C 37/0007 425/444
10,086,546 B2 * 10/2018 Tokuyama .............. B29C 45/42

FOREIGN PATENT DOCUMENTS

| JP | 2000317949 A | 11/2000 |
|----|--------------|---------|
| JP | 2004106079 A | 4/2004 |
| JP | 2010589 A | 1/2010 |

OTHER PUBLICATIONS

English Machine Translation of Decision to Grant a Patent mailed by Japan Patent Office (JPO) for Application No. JP 2016-234899, dated Jul. 10, 2018, 3 pages.
English Machine Translation of Notification of Reasons for Refusal mailed by Japan Patent Office (JPO) for Application No. JP 2016-234899, dated Mar. 13, 2018, 2 pages.
Untranslated Notification of Reasons for Refusal mailed by Japan Patent Office (JPO) for Application No. JP 2016-234899, dated Mar. 13, 2018, 2 pages.
English Abstract and Machine Translation for Japanese Publication No. JPH06-198687 A, published Jul. 19, 1994, 9 pgs.
English Abstract and Machine Translation for Japanese Publication No. 2004-106079 A, published Apr. 8, 2004, 28 pgs.
English Abstract and Machine Translation for Japanese Publication No. 2010-000589 A, published Jan. 7, 2010, 13 pgs.
English Abstract and Machine Translation for Japanese Publication No. JPH10-016022 A, published Jan. 20, 1998, 6 pgs.
English Abstract and Machine Translation for Japanese Publication No. 2000-317949 A, published Nov. 21, 2000, 8 pgs.

* cited by examiner

MOLDING SYSTEM PROVIDED WITH MOLDING MACHINE AND MOLDED ARTICLE REMOVAL DEVICE

BACKGROUND OF THE INVENTION

1. Field of the Invention

The invention relates to a molding system provided with a molding machine and a molded article removal device.

2. Description of the Related Art

A technology for positioning a mold at a fixed position with respect to a molding machine when replacing the mold of the molding machine is known (i.e., JP-A-2000-317949).

There is currently a demand for technology that employs a molded article removal device composed of a robot and the like to perform highly accurate operations (e.g. inserting an insert in the molded article) on a molded article formed by the mold of the molding machine.

SUMMARY OF THE INVENTION

A molding system includes a molding machine in which a mold is installed; a molded article removal device capable of removing a master work attached to the mold; and a measurement section configured to measure a position of the master work held by the molded article removal device when the molded article removal device removes the master work attached to the mold, as a reference position.

The measurement section is configured to measure a position of the master work held by the molded article removal device when the molded article removal device removes the master work attached to the mold after measuring the reference position, as a detected position.

The molding system includes a displacement calculation section configured to calculate a difference between the reference position and the detected position measured by the measurement section, as a displacement amount; and a correction section configured to correct a work position in a molded article molded by the molding machine with the mold, based on the displacement amount calculated by the displacement calculation section, wherein the work position is a position where the molded article removal device carries out a work on the molded article.

The molded article removal device may repeatedly carry out removing the master work attached to the mold, after the measurement section measures the reference position. The measurement section may measure the detected position each time the molded article removal device removes the master work attached to the mold. The displacement calculation section may calculate the displacement amount each time the measurement section measures the detected position.

The molding system may further include a displacement difference calculation section configured to calculate a displacement difference which is a difference between a first displacement amount calculated by the displacement calculation section and a second displacement amount calculated by the displacement calculation section prior to the first displacement amount.

The molding system may further include a determination section configured to determine whether the displacement difference calculated by the displacement difference calculation section is equal to or less than a predetermined threshold value. The correction section may correct a removal position as the work position where the molded article removal device removes the molded article in the mold, based on the displacement amount.

The correction section may correct an insertion position as the work position where the molded article removal device inserts an insert part into the molded article in the mold, based on the displacement amount. The molded article removal device may be a robot. The measurement section may include an imaging section configured to image the master work.

BRIEF DESCRIPTION OF THE DRAWINGS

The above-described or other objects, features and advantages of the invention will become more apparent from the following description of the embodiments in connection with the accompanying drawings, in which.

DETAILED DESCRIPTION

Figure 1:
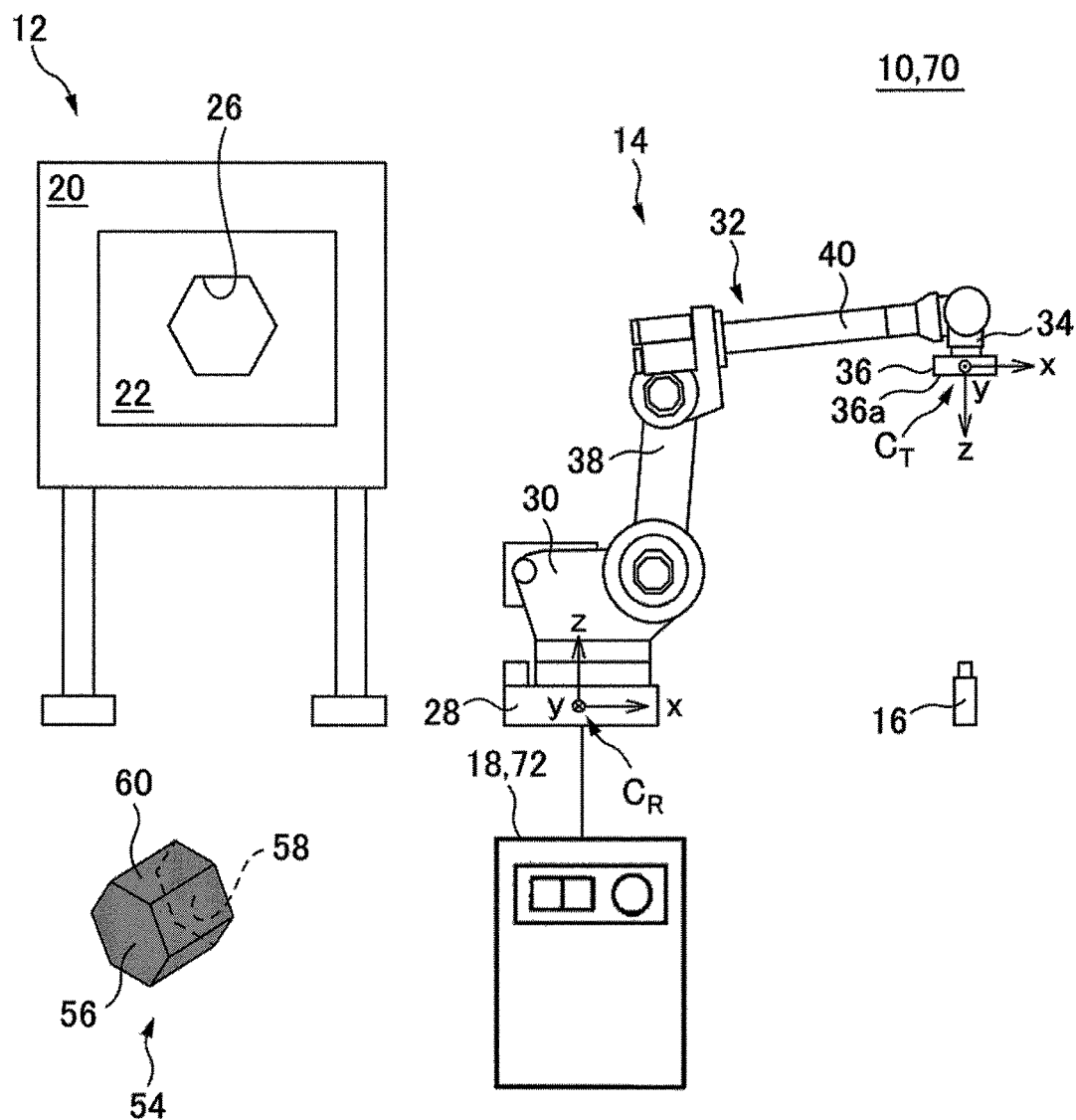
FIG. 1 is a view of a molding system according to an embodiment.

Below, embodiments of the invention are described in detail with reference to the drawings. Note that, in the various embodiments described below, similar elements are assigned the same reference numerals, and repetitive descriptions thereof will be omitted. Herein, the robot coordinate system $C_R$ in FIG. 1 is used as a standard for directions, and for the sake of convenience, the x-axis positive direction of the robot coordinate system $C_R$ is referred to as to rightward, the y-axis positive direction is referred to as rearward, and the z-axis positive direction is referred to as upward.

First, a molding system 10 according to an embodiment will be described with reference to FIGS. 1 and 2. The molding system 10 includes a molding machine 12, a robot 14, a measurement section 16, and a robot controller 18.

The molding machine 12 is e.g. an injection molding machine or a die cast molding machine, and includes a mold installation portion 20 and a mold 22.

The mold 22 is formed with a cavity 26 into which material such as resin is injected. The molding machine 12 fills the cavity 26 of the mold 22 with the material, and molds a molded article. In this embodiment, the cavity 26 is a space having a hexagonal prism shape.

The robot 14 is a vertical articulated robot, and includes a robot base 28, a revolving drum 30, a robot arm 32, a wrist 34, and an end effector 36. The robot base 28 is fixed on a floor of a work cell. The revolving drum 30 is mounted on the robot base 28 so as to be able to revolve about a vertical axis.

The robot arm 32 includes an upper arm 38 rotatably coupled to the revolving drum 30 and a forearm 40 rotatably coupled to a distal end of the upper arm 38. The wrist 34 is attached to a distal end of the forearm 40, and supports the end effector 36 so as to be rotatable about three axes.

In this embodiment, the end effector 36 includes an adsorption surface 36a (not illustrated), and is able to adsorb and hold a master work 54 and a molded article described below by the adsorption surface 36a.

The adsorption surface 36a is composed of e.g. an air suction device, an electromagnet, or a sucker. Alternatively, the end effector 36 may include a gripper (not illustrated) able to grip an insert part described below, wherein the gripper may be a robot hand including openable and closeable fingers.

Figure 2:
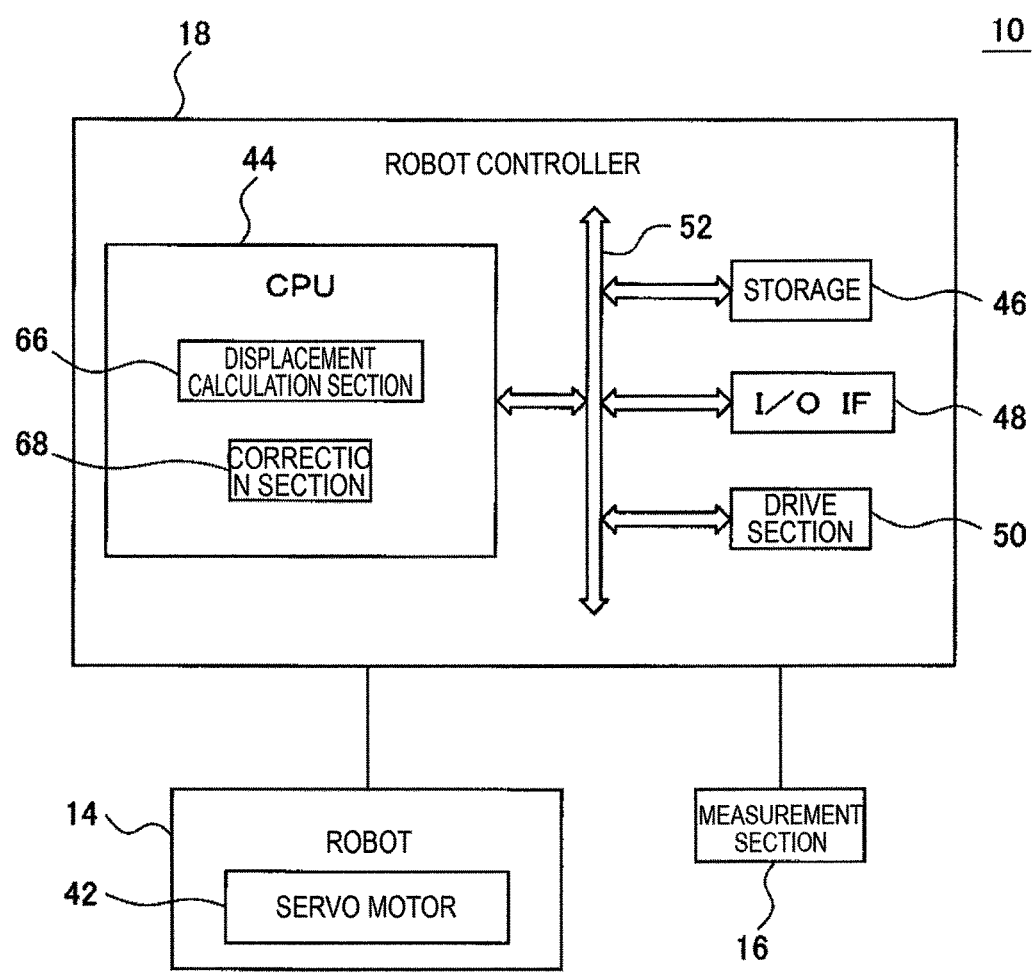
FIG. 2 is a block diagram of the molding system illustrated in FIG. 1.

The robot 14 includes a plurality of servomotors 42 (FIG. 2). The servo motors 42 are built in the revolving drum 30, the robot arm 32, and the wrist 34, respectively, and rotate these components about the respective rotation axes in accordance with commands from the robot controller 18.

The robot coordinate system $C_R$ is set as an automatic control-coordinate system for controlling the components of the robot 14. The robot controller 18 operates the components of the robot 14 with reference to the robot coordinate system $C_R$. For example, the z-axis of the robot coordinate system $C_R$ is arranged parallel with the vertical direction of real space, and the revolving drum 30 is rotated about the z-axis of the robot coordinate system $C_R$.

On the other hand, a tool coordinate system $C_T$ is set for the end effector 36. The tool coordinate system $C_T$ is an automatic control-coordinate system which defines the position and orientation of the end effector 36 in the robot coordinate system $C_R$.

For example, the tool coordinate system $C_T$ is set such that the origin of the tool coordinate system $C_T$ is arranged at the center of the adsorption surface 36a of the end effector 36, and the z-axis of the tool coordinate system $C_T$ is orthogonal to the adsorption surface 36a.

The robot controller 18 operates the revolving drum 30, the robot arm 32, and the wrist 34 in the robot coordinate system $C_R$ so as to match the position and orientation of the end effector 36 with those defined by the tool coordinate system $C_T$. In this way, the end effector 36 is positioned at any position and orientation in the robot coordinate system $C_R$.

The measurement section 16 is e.g. a vision sensor, and includes an imaging section capable of imaging an article. The imaging section includes an imaging element such as a charge-coupled device (CCD) or complementary metal oxide semiconductor (CMOS) sensor. The measurement section 16 images an article and sends the image data thereof to the robot controller 18 in accordance with a command from the robot controller 18. Note that, the function of the measurement section 16 will be described below.

The robot controller 18 directly or indirectly controls each component of the robot 14. Specifically, as illustrated in FIG. 2, the robot controller 18 includes a CPU 44, a storage 46, an input/output interface (I/O interface) 48, and a drive section 50.

The CPU 44 is communicably connected to the storage 46, the I/O interface 48, and the drive section 50 via a bus 52, and carries out various processes described below while communicating with these components.

The storage 46 includes an electrically erasable/recordable nonvolatile memory such as EEPROM (registered trademark), and stores constants, variables, setting values, programs, and the like necessary for the CPU 44 to execute the various processes such that these data are not lost when the molding system 10 is shut down.

Additionally, the storage 46 includes a RAM such as DRAM or SRAM capable of high-speed reading/writing, and temporarily stores data necessary for the CPU 44 to execute the various processes. Further, the constants, variables, setting values, parameters, programs, and the like stored in the nonvolatile memory are appropriately loaded onto the RAM, and the CPU 44 uses the data loaded onto the RAM to execute the various processes.

The I/O interface 48 is communicably connected to the measurement section 16, and receives data from the measurement section 16 in accordance with a command from the CPU 44. The I/O interface 48 may be constituted by e.g. an ethernet port or a USB port, and communicate with the measurement section 16 via wired communication. Alternatively, the I/O interface 48 may communicate with the measurement section 16 via Wi-Fi or wireless LAN by wireless communication.

The drive section 50 drives each servomotor 42 built in the robot 14 in accordance with a command from the CPU 44. Specifically, the drive section 50 includes e.g. an inverter or servo amplifier, and sends a command (speed command, torque command, etc.) to each servomotor 42 so as to drive the servo motor 42.

The molding system 10 evaluates a displacement amount of the position of the mold 22 installed in the mold installation portion 20 from a suitable position, with using the master work 54 (FIG. 1). The master work 54 has a shape of a hexagonal prism coinciding with the cavity 26 formed at the mold 22, and can be fit into the cavity 26 without gap.

More specifically, the master work 54 includes a front surface 56, a rear surface 58 opposite the front surface 56, and a side surface 60 extending between the front surface 56 and the rear surface 58. Each of the front surface 56 and the rear surface 58 has a shape of a hexagon coinciding with the cavity 26. The side surface 60 is a tubular surface of hexagonal prism shape, and extends over the circumference of the master work 54.

Figure 3:
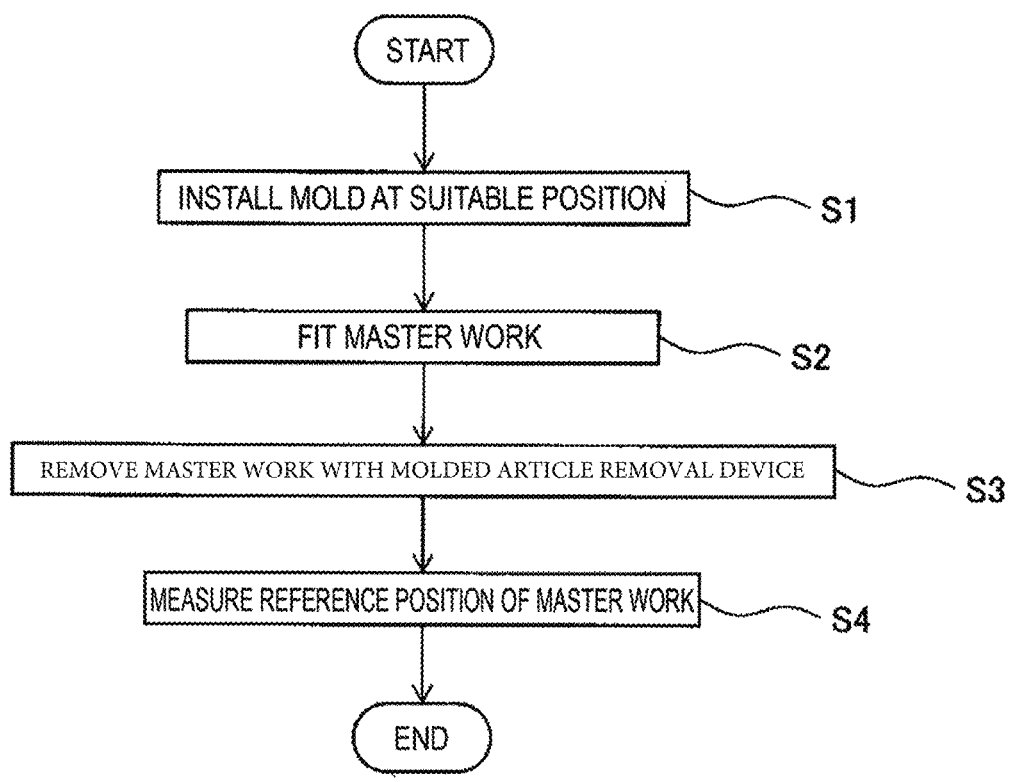
FIG. 3 is a flowchart illustrating an example of an operation flow of the molding system illustrated in FIG. 1.

Next, the operation of the molding system 10 will be described. When the molding system 10 is operated, a reference position measuring flow illustrated in FIG. 3 is firstly carried out. In step S1, the user sets the mold 22 in the mold installation portion 20 at a suitable position with respect to the mold installation portion 20. The suitable position is determined by that the user adjusts the position of the mold 22 in the rotation direction with using a level gauge such that the upper surface of the mold 22 is horizontal.

For example, the suitable position is determined as a position of the mold 22 with respect to the mold installation portion 20 in which the upper surface of the mold 22 is horizontal when the mold 22 is installed in the mold installation portion 20. FIG. 1 illustrates a state in which the mold 22 is arranged at the suitable position.

In step S2, the user or the robot 14 fits the master work 54 into the cavity 26 of the mold 22 installed at the suitable position. At this time, the master work 54 is fit into the cavity 26 such that the rear surface 58 of the master work 54 faces a bottom surface of the cavity 26, and the front surface 56 of the master work 54 faces the outside. This state is illustrated in FIG. 4.

Figure 4:
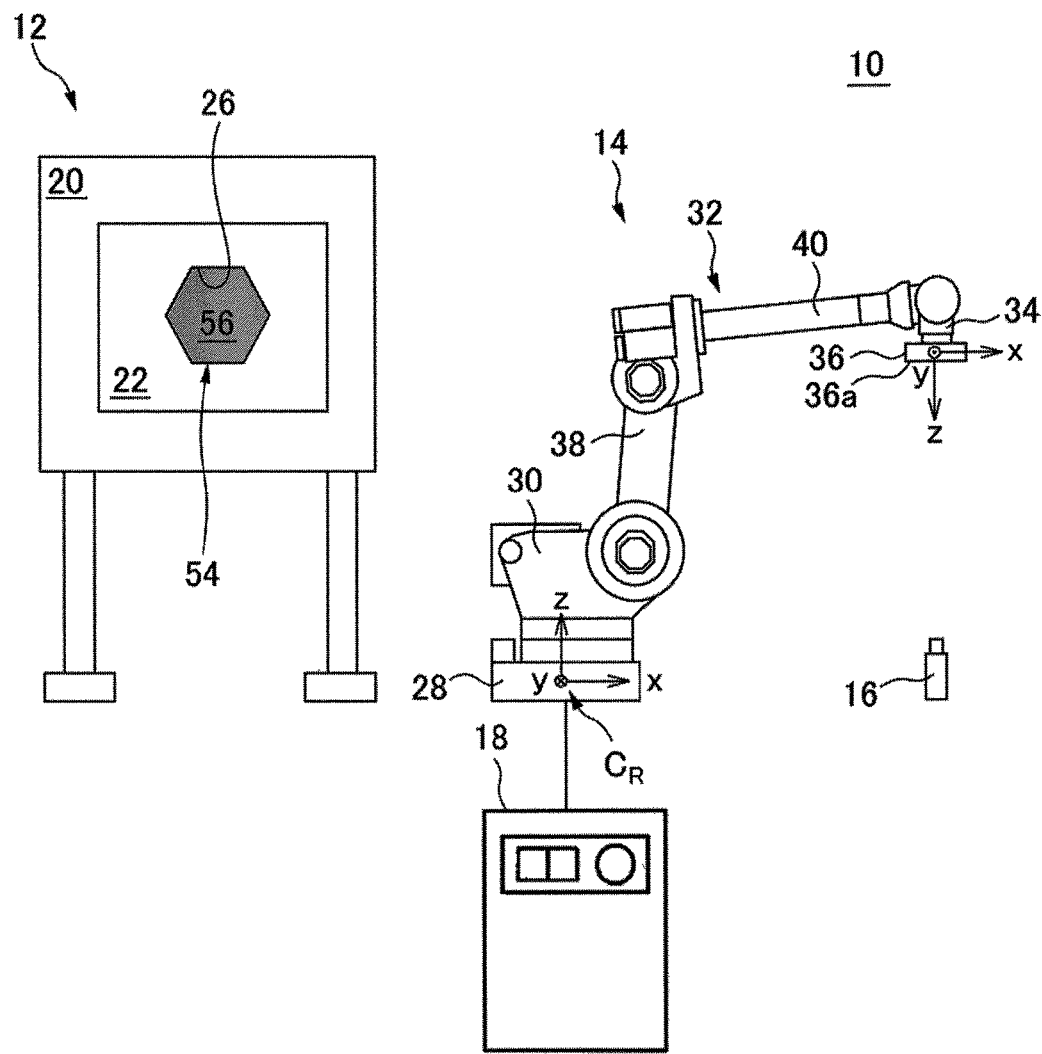
FIG. 4 is a view of a state when step S2 in FIG. 3 has ended.

In this embodiment, when the master work 54 is fit into the cavity 26 as illustrated in FIG. 4, the front surface 56 of the master work 54 is disposed substantially parallel with the x-z plane of the robot coordinate system $C_R$.

In step S3, the CPU 44 of the robot controller 18 carries out a master work removal operation of removing the master work 54 from the mold 22. Specifically, the CPU 44 operates the robot 14 as described below in accordance with a robot program.

Figure 5:
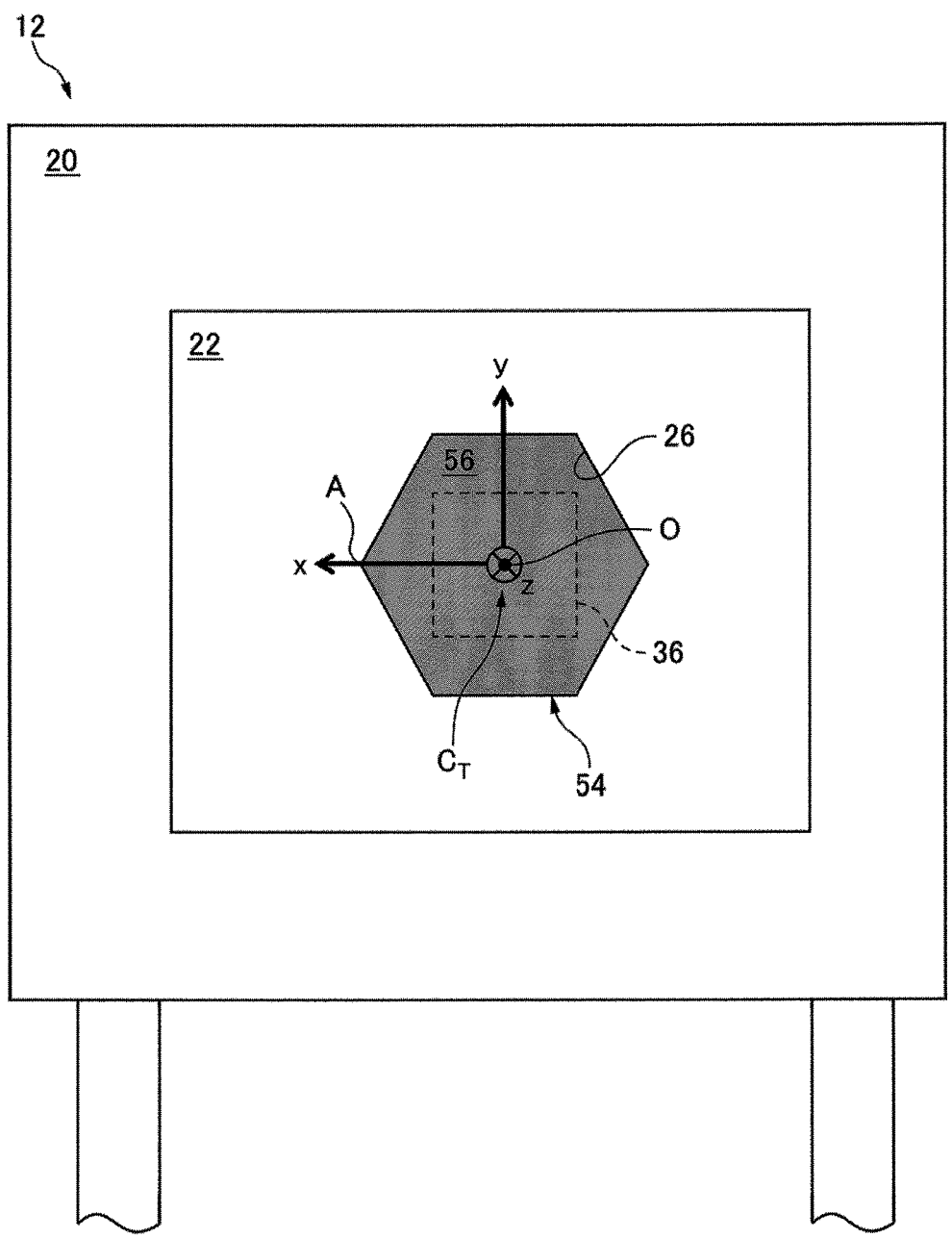
FIG. 5 is a view illustrating an example of a tool coordinate system established in step S3 in FIG. 3.

First, the CPU 44 sets the tool coordinate system $C_T$ as illustrated in FIG. 5. In the example illustrated in FIG. 5, the origin (or the z-axis) of the tool coordinate system $C_T$ is arranged frontward of the center O of the master work 54.

Further, the z-axis of the tool coordinate system $C_T$ is orthogonal to the front surface 56 of the master work 54 (i.e., the x-z plane of the robot coordinate system $C_R$). Further, a projection point of one corner A of the master work 54 when the corner A is projected on the x-y plane of the tool coordinate system $C_T$ is arranged on the x-axis of the tool coordinate system $C_T$.

Then, the CPU 44 sends a command to each servomotor 42 built in the robot 14 through the drive section 50 so as to arrange the end effector 36 at a position and orientation defined by the tool coordinate system $C_T$ illustrated in FIG. 5.

When the end effector 36 is arranged at the position and orientation defined by the tool coordinate system $C_T$ illustrated in FIG. 5, the end effector 36 is positioned relative to the master work 54 as indicated by the dotted line 36 in FIG. 5, and the adsorption surface 36a of the end effector 36 contacts the front surface 56 of the master work 54.

Then, the CPU 44 operates the end effector 36 so as to adsorb the front surface 56 of the master work 54 by the adsorption surface 36a. Then, the CPU 44 sets the tool coordinate system $C_T$ as illustrated in FIG. 6.

Figure 6:
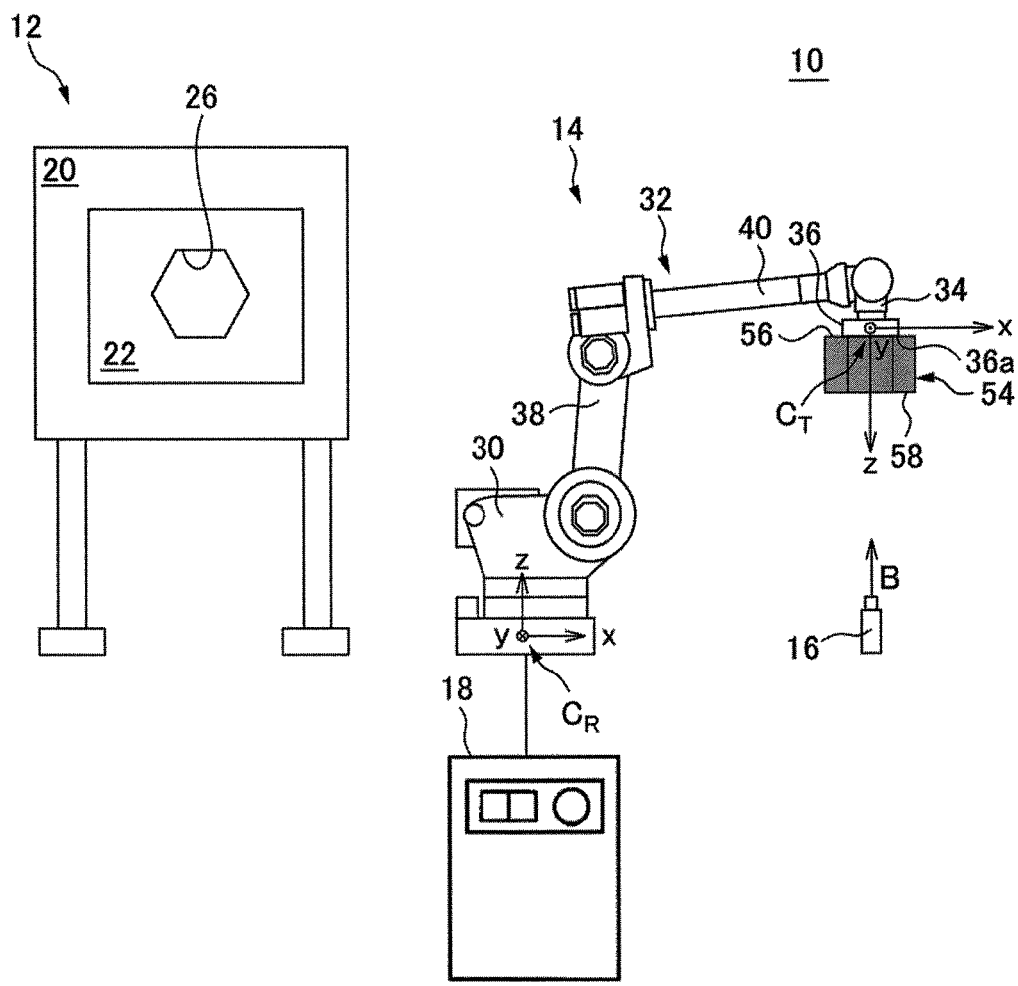
FIG. 6 is a view of a state when step S3 in FIG. 3 has ended.

In the example illustrated in FIG. 6, the position in the horizontal plane (i.e., the x-y plane of the robot coordinate system $C_R$) of a visual-line direction B of the imaging section of the measurement section 16 coincides with that of the z-axis of the tool coordinate system $C_T$.

Then, the CPU 44 sends a command to each servomotor 42 through the drive section 50 so as to arrange the end effector 36 at a position and orientation defined by the tool coordinate system $C_T$ illustrated in FIG. 6.

As a result, the end effector 36 and the master work 54 are disposed upward of the measurement section 16, as illustrated in FIG. 6. In this way, the CPU 44 carries out the master work removal operation in accordance with the robot program.

The robot program is constructed by teaching the above-mentioned master work removal operation to the robot 14, and is pre-stored in the storage 46. The robot program includes a command to be sent to each servomotor 42 from the CPU 44 in order to carry out the master work removal operation.

Thus, in this embodiment, the robot 14 functions as a molded article removal device configured to remove the master work 54 attached to the mold 22.

In step S4, the CPU 44 operates the measurement section 16 so as to measure a reference position of the master work 54. Specifically, the CPU 44 sends a position-measurement command to the measurement section 16. The measurement section 16 images the master work 54 in the state illustrated in FIG. 6 when receiving the position-measurement command from the CPU 44.

Figure 7:
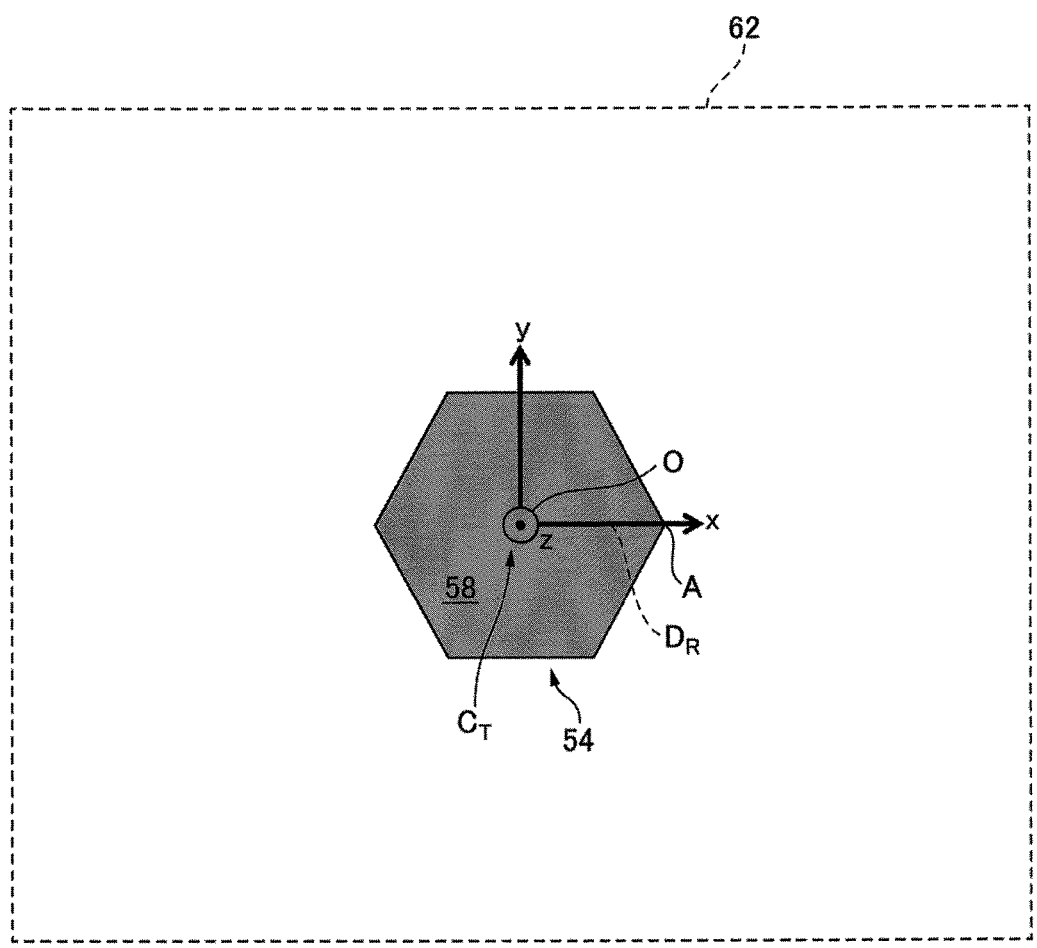
FIG. 7 is a view illustrating an example of an image imaged by the measurement section in step S4 in FIG. 3.

An example of the image imaged by the measurement section 16 is illustrated in FIG. 7. Note that, in the image 62 illustrated in FIG. 7, the tool coordinate system $C_T$ of FIG. 6 is shown for the sake of easy understanding. The measurement section 16 sends the imaged image 62 to the I/O interface 48.

The CPU 44 receives the image 62 via the I/O interface 48, and stores in the storage 46 the position of the master work 54 in the image 62 as the reference position. In this way, the measurement section 16 measures the reference position of the master work 54 by imaging the master work 54 held by the robot 14.

Figure 8:
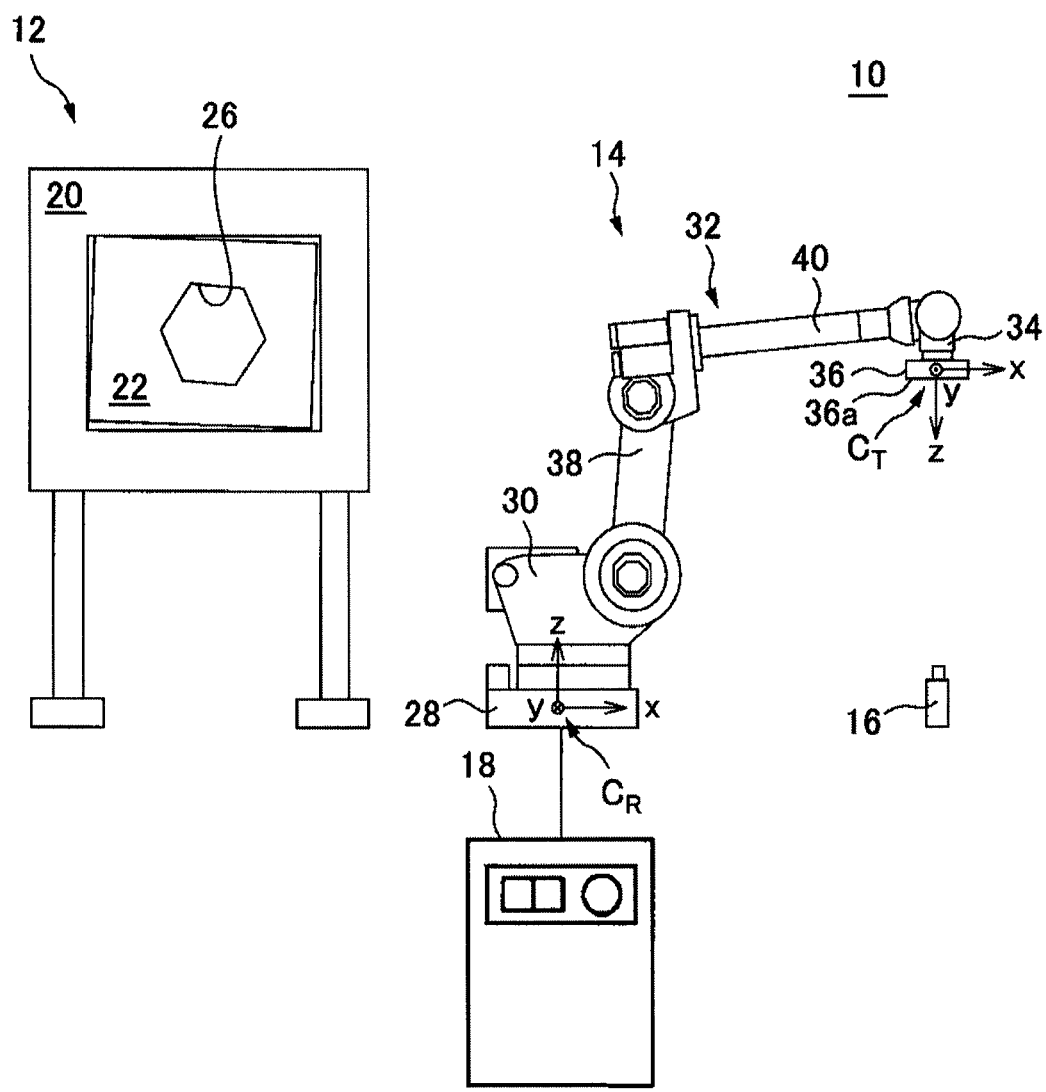
FIG. 8 is a view illustrating a state in which the molding machine is installed with a mold after replacing the mold.

After the flow illustrated in FIG. 3 is ended, the user replaces the mold 22 with another mold (not illustrated), and then installs the mold 22 in the mold installation portion 20 again. At this time, the mold 22 may be skewed or displaced with respect to the mold installation portion 20, as illustrated in FIG. 8.

In order to address this, the molding system 10 according to this embodiment calculates such a displacement amount from the suitable position by comparing the position of the mold 22 with the reference position of the master work 54 acquired in the above-described step S4.

Then, on the basis of the calculated displacement amount, the molding system 10 corrects the work position in the molded article where the robot 14 carries out a work on the molded article molded by the molding machine 12 with the mold 22.

Figure 9:
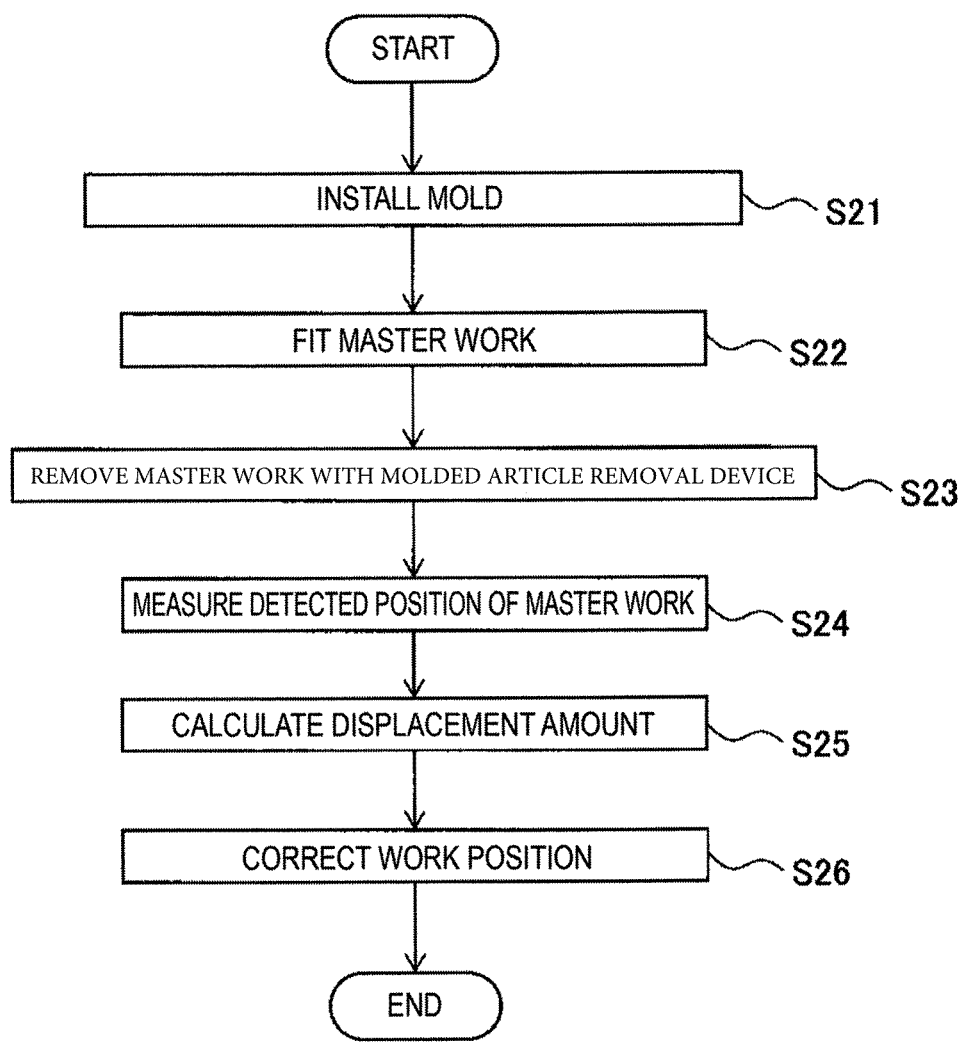
FIG. 9 is a flowchart illustrating an example of an operation flow of the molding system illustrated in FIG. 1.

The work position correction operation will be described below with reference to FIG. 9. The flow illustrated in FIG. 9 is started after the flow illustrated in FIG. 3 is ended and the mold 22 illustrated in FIG. 1 is replaced.

In step S21, the user fixes the mold 22 in the mold installation portion 20. Below, a case is described where the mold 22 is fixed in the mold installation portion 20 in a skewed manner as illustrated in FIG. 8 in step S21.

Figure 10:
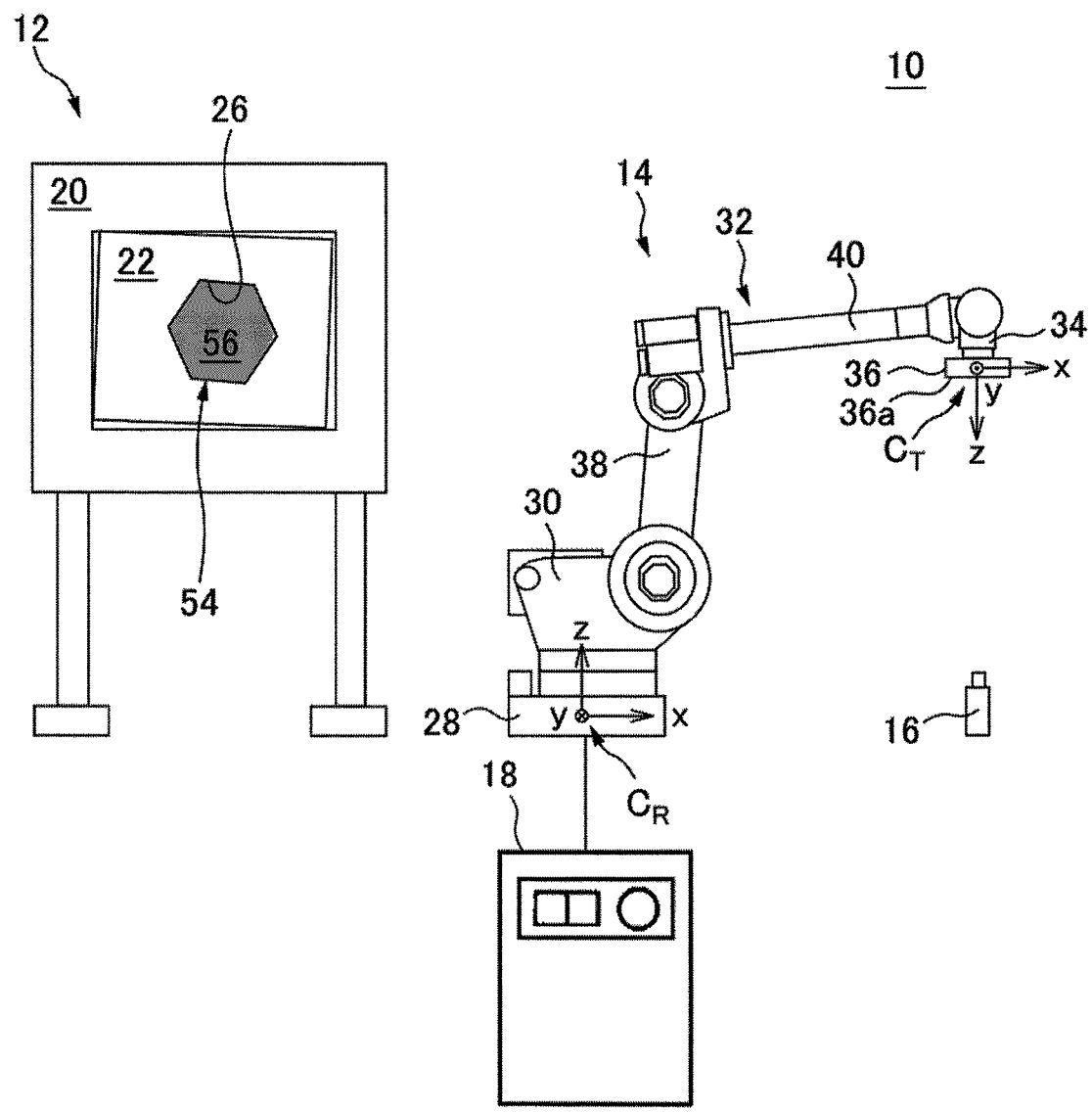
FIG. 10 is a view of a state when step S22 in FIG. 9 has ended.

In step S22, the user or the robot 14 fits the master work 54 into the cavity 26 of the mold 22 illustrated in FIG. 8. At this time, the master work 54 is fit into the cavity 26 such that the rear surface 58 of the master work 54 faces the bottom surface of the cavity 26, and the front surface 56 of the master work 54 faces the outside. This state is illustrated in FIG. 10. In step S23, the CPU 44 of the robot controller 18 causes the robot 14 to carry out the above-mentioned master work removal operation so as to remove the master work 54 illustrated in FIG. 10 from the mold 22, in accordance with the robot program.

Figure 11:
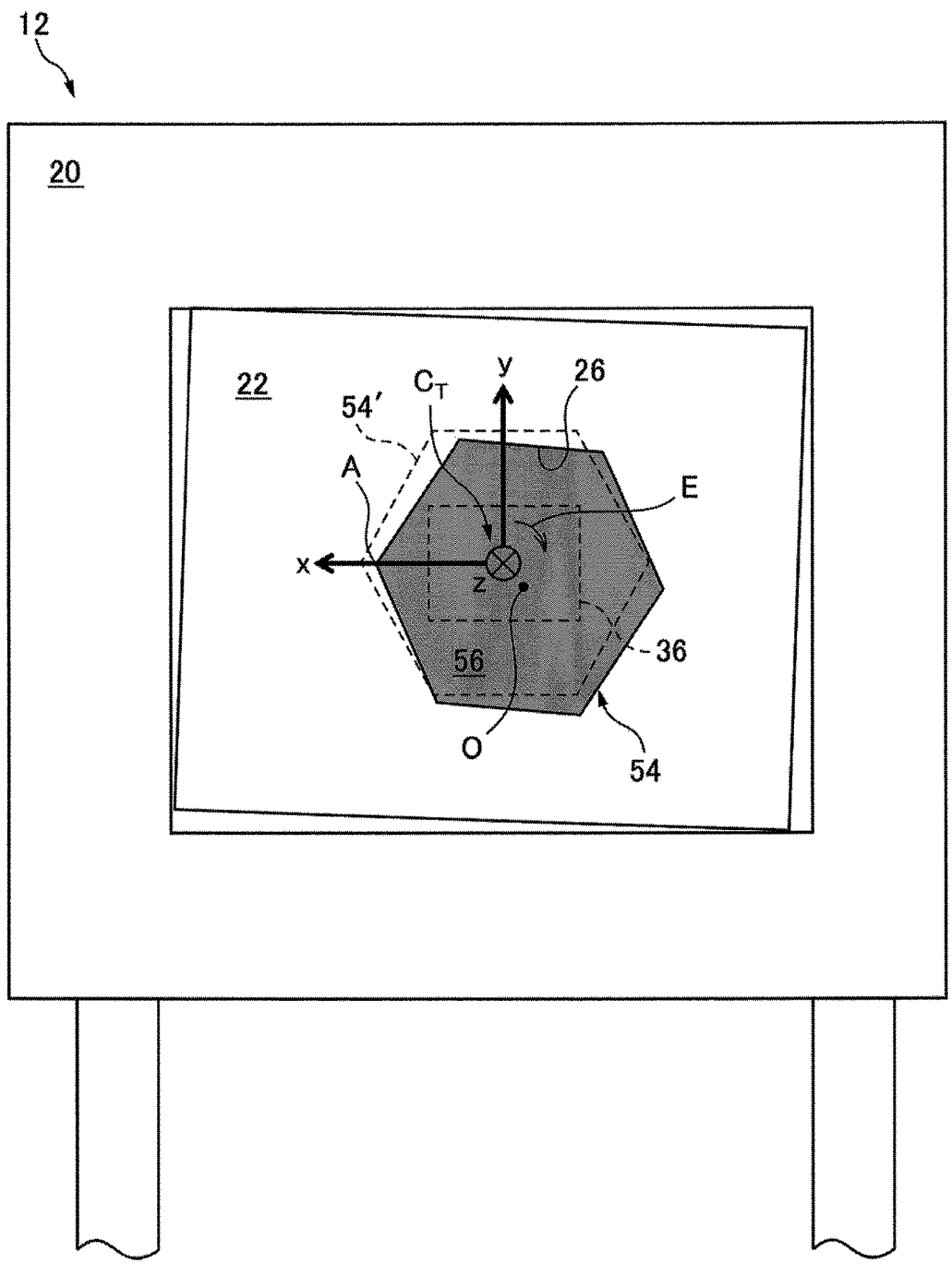
FIG. 11 is a view illustrating an example of a tool coordinate system established in step S23 in FIG. 9.

Specifically, the CPU 44 sets the tool coordinate system $C_T$ such that the position of the origin and the axial directions thereof are the same as those illustrated in FIG. 5. This state is illustrated in FIG. 11. Note that, in FIG. 11, the position of the master work 54 in FIG. 5 is indicated by the dotted line 54' for the sake of easy understanding.

As illustrated in FIG. 11, if the mold 22 is installed in the mold installation portion 20 in a skewed manner, the center O of the master work 54 is disposed from the origin of the tool coordinate system $C_T$ (i.e., the z-axis) in the x-y plane of the tool coordinate system $C_T$.

Then, the CPU 44 sends a command to each servomotor 42 built in the robot 14 through the drive section 50 so as to arrange the end effector 36 at a position and orientation defined by the tool coordinate system $C_T$ illustrated in FIG. 11.

When the end effector 36 is arranged at the position and orientation defined by the tool coordinate system $C_T$ illustrated in FIG. 11, the end effector 36 is positioned with respect to the master work 54 as indicated by the dotted line 36 in FIG. 11, and the adsorption surface 36a of the end effector 36 contacts the front surface 56 of the master work 54.

Then, the CPU 44 operates the end effector 36 so as to adsorb the front surface 56 of the master work 54 by the adsorption surface 36a. Then, the CPU 44 sets the tool coordinate system $C_T$ such that the position of the origin and the axial directions thereof are the same as those illustrated in FIG. 6.

Then, the CPU 44 sends a command to each servomotor 42 through the drive section 50 so as to arrange the end effector 36 at a position and orientation defined by the set tool coordinate system $C_T$.

Figure 12:
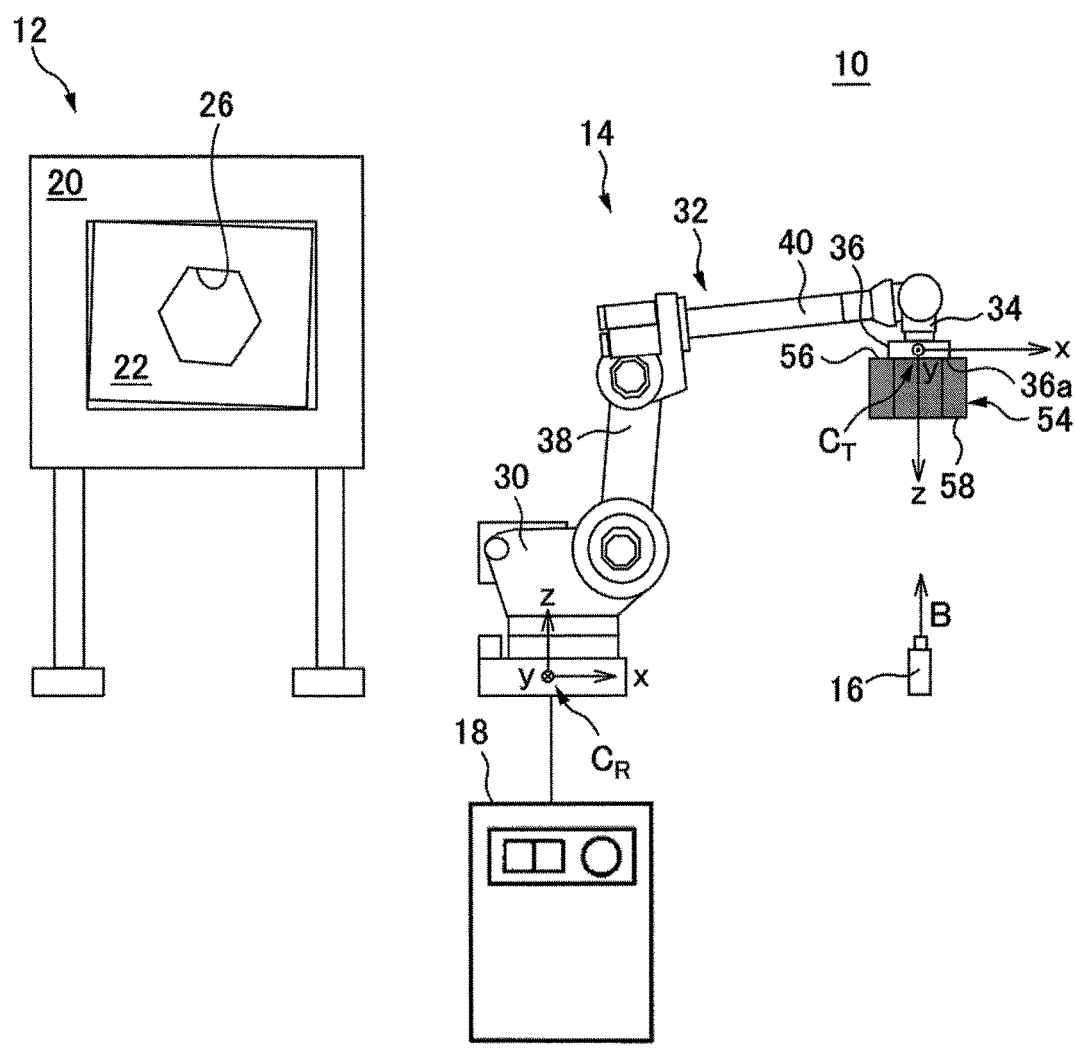
FIG. 12 is a view of a state when step S23 in FIG. 9 has ended.

As a result, as illustrated in FIG. 12, the end effector 36 and the master work 54 are disposed upward of the measurement section 16. In this way, the CPU 44 executes the master work removal operation on the master work 54 illustrated in FIG. 10.

In step S24, the CPU 44 operates the measurement section 16 so as to measure the position of the master work 54. Specifically, the CPU 44 sends a position-measurement command to the measurement section 16. When receiving the position-measurement command from the CPU 44, the measurement section 16 images the master work 54 held by the end effector 36 as illustrated in FIG. 12.

Figure 13:
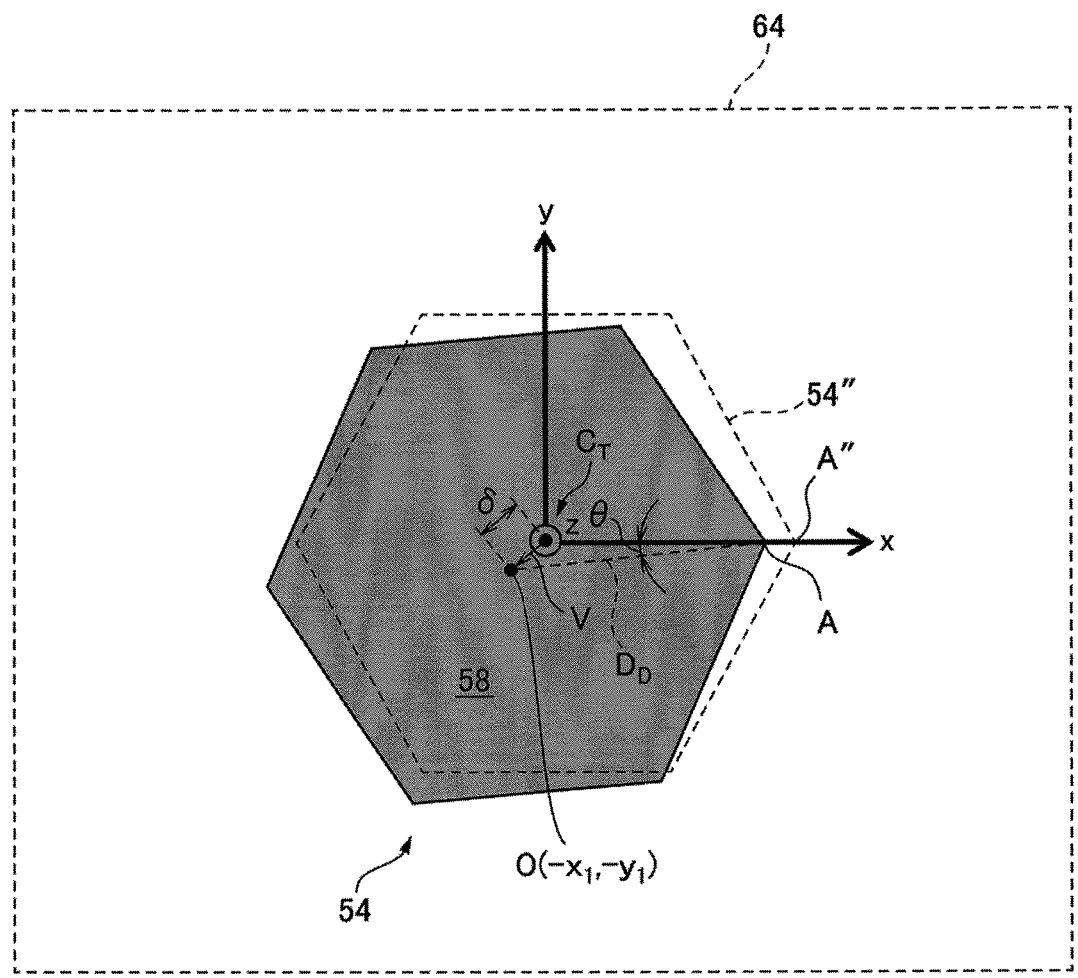
FIG. 13 is a view illustrating an example of an image imaged by the measurement section in step S24 in FIG. 9.

An example of the image imaged by the measurement section 16 at this time is illustrated in FIG. 13. Note that, in the image 64 illustrated in FIG. 13, the tool coordinate system $C_T$ is shown, and the reference position of the master work 54 illustrated in FIG. 7 is indicated by the dotted line 54", for the sake of easy understanding.

As illustrated in FIG. 13, in the image 64, the center O of the master work 54 is displaced from the origin of the tool coordinate system $C_T$ (i.e., the center of the reference position 54") by the distance δ in the x-y plane of the tool coordinate system $C_T$.

For example, if the image 64 is represented as coordinates in the x-y plane of the tool coordinate system $C_T$, the center of the reference position 54" is defined as the origin (0, 0). On the other hand, the coordinates of the center O of the master work 54 are $(-x_1, -y_1)$. Accordingly, the distance δ is $(x_1^2+y_1^2)^{1/2}$.

Further, an angle θ about the z-axis of the tool coordinate system $C_T$ is formed between an imaginary line $D_D$, which connects the center O and the corner A of the master work 54, and the x-axis of the tool coordinate system $C_T$ (i.e., the imaginary line that connects the center and the corner A" of the reference position 54").

The measurement section 16 sends the captured image 64 to the I/O interface 48. The CPU 44 receives the image 64 via the I/O interface 48, and stores in the storage 46 the position of the master work 54 in the image 64 as a detected position.

In step S25, the CPU 44 calculates the difference between the reference position and the detected position as the displacement amount. Specifically, the CPU 44 reads out from the storage 46 the reference position of the master work 54 in the image 62 stored in step S4 and the detected position of the master work 54 in the image 64 stored in step S24.

As an example, the CPU 44 analyses the image 62 illustrated in FIG. 7 and detects the center of the master work 54 in the image 62 (i.e., the center of the reference position 54" in FIG. 13). Then, the CPU 44 calculates the coordinates $P_R$ (0, 0) in the x-y plane of the tool coordinate system $C_T$ of the detected center of the reference position 54".

On the other hand, the CPU 44 analyses the image 64 illustrated in FIG. 13 and detects the center O of the master work 54 in the image 64. Then, the CPU 44 calculates the coordinates $P_D$ $(-x_1, -y_1)$ in the x-y plane of the tool coordinate system $C_T$ of the detected center O in the image 64. Then, the CPU 44 calculates the vector V $(-x_1, -y_1)$ from the coordinates $P_R$ to the coordinates $P_D$ as the displacement amount indicative of the difference in the x-y plane between the reference position and the detected position.

In addition, the CPU 44 analyses the image 62 illustrated in FIG. 7 and calculates an imaginary line $D_R$(FIG. 7) that connects the center O and the corner A of the master work 54 in the image 62. In this embodiment, the imaginary line $D_R$ coincides with the x-axis of the tool coordinate system $C_T$.

On the other hand, the CPU 44 analyses the image 64 illustrated in FIG. 13 and calculates the imaginary line $D_D$ that connects the center O and the corner A of the master work 54 in the image 64. Then, the CPU 44 calculates the angle θ between the imaginary line $D_R$ (i.e., the x-axis of the tool coordinate system $C_T$) and the imaginary line $D_D$ as the displacement amount indicative of the difference between the reference position and the detected position about the z-axis.

Then, the CPU 44 stores the calculated vector V $(-x_1, -y_1)$ and the angle θ in the storage 46. Thus, in this embodiment, the CPU 44 functions as a displacement calculation section 66 (FIG. 2) configured to calculate the displacement amount.

In step S26, the CPU 44 corrects the work position in the molded article where the robot 14 carries out a work (e.g., removing the molded article, or inserting an insert part into the molded article) on the molded article in step 33 described below.

As an example, the CPU 44 corrects the robot program such that the position of the tool coordinate system $C_T$ to be set when carrying out the work on the molded article in following step S33 is moved by the displacement amount calculated in step S25.

Here, it is assumed that the CPU 44 sets the tool coordinate system $C_T$ when the robot 14 carries out the work on the molded article in the following step S33 as illustrated in FIG. 11.

In this case, the CPU 44 moves the origin (i.e., the z-axis) of the tool coordinate system $C_T$ to be set in the following step S33 from the position illustrated in FIG. 11 by the vector V $(-x_1, -y_1)$ in the x-y plane of the tool coordinate system $C_T$ (i.e., moves the origin by $x_1$ in the x-axis negative direction and $y_1$ in the y-axis negative direction).

Additionally, the CPU 44 rotates the tool coordinate system $C_T$ to be set in the following step S33 from the position illustrated in FIG. 11 about the z-axis by the angle θ in the direction indicated by an arrow E in FIG. 11. As a result, the tool coordinate system $C_T$ to be set in step S33 is changed to the position illustrated in FIG. 14. In this way, the CPU 44 corrects the robot program so as to change the setting of the tool coordinate system $C_T$ when executing step S33.

As another example, the CPU 44 may arrange the end effector 36 at the position and orientation defined by the tool coordinate system $C_T$ set as illustrated in FIG. 11 in the following step S33, and after that, further move the end effector 36 by the displacement amount calculated in step S25.

In this case, the CPU 44 moves the end effector 36 arranged at the tool coordinate system $C_T$ illustrated in FIG. 11 by the vector V ($-x_1$, $-y_1$) in the x-y plane of the tool coordinate system $C_T$.

Together with this, the CPU 44 rotates the end effector 36 about the z-axis by the angle θ in the direction of the arrow E in FIG. 11. The CPU 44 corrects the robot program so as to carry out such operations.

Figure 15:
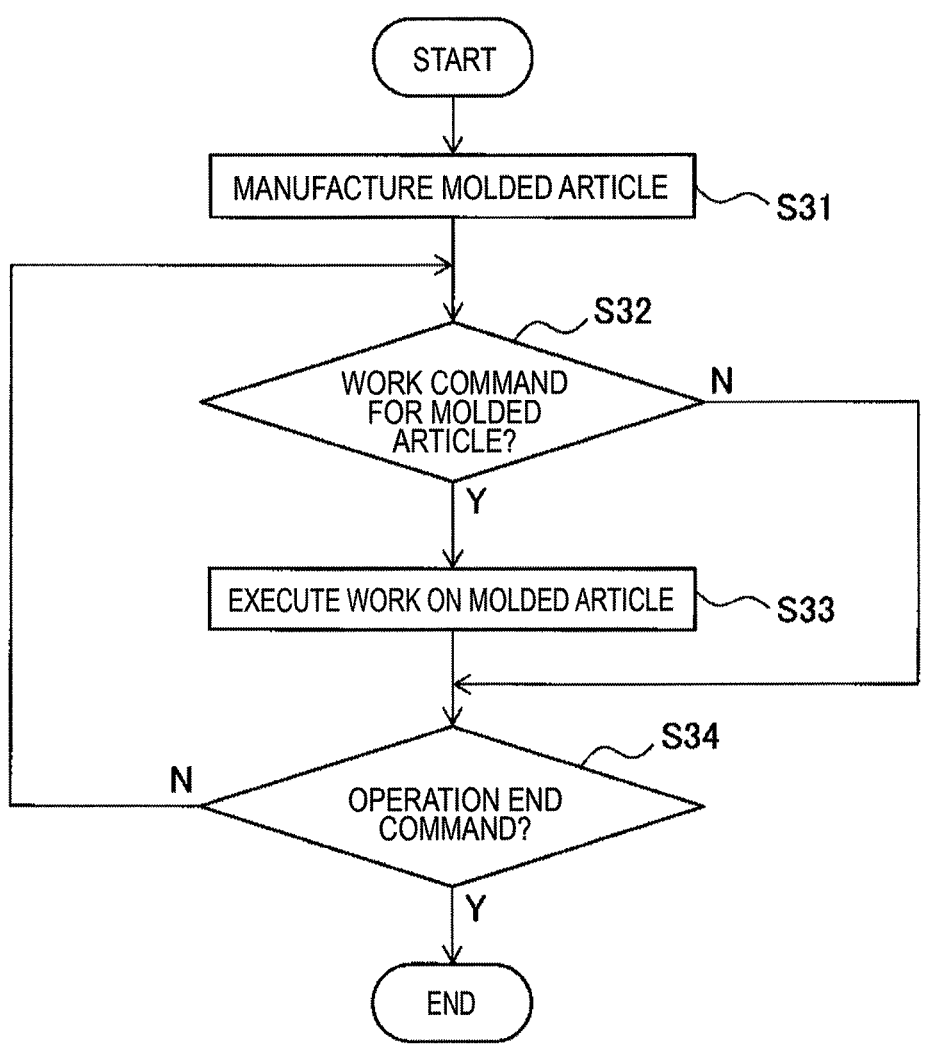
FIG. 15 is a flowchart illustrating an example of an operation flow of the molding system illustrated in FIG. 1.

After the execution of the flow illustrated in FIG. 9, the CPU 44 carries out the flow illustrated in FIG. 15. In step S31, the molding machine 12 molds the molded article with the mold 22. Specifically, the material such as resin is injected into the cavity 26 of the mold 22. The molding machine 12 fills up the cavity 26 of the mold 22 with the material and molds the molded article.

In step S32, the CPU 44 determines whether or not it receives a work command for carrying out the work on the molded article from the user, host controller, or a molding program. The work command includes a command for causing the robot 14 to carry out the work of removing the molded article from the mold 22, or inserting an insert part into the molded article in the mold 22, for example.

When the CPU 44 determines that it receives the work command (i.e., determines YES), the CPU 44 proceeds to step S33. On the other hand, when the CPU 44 determines that it does not receive the work command (i.e., determines NO), the CPU 44 proceeds to step S34.

In step S33, the CPU 44 carries out the work on the molded article. As an example, if the robot program is corrected so as to change the setting of the tool coordinate system $C_T$ in the above-mentioned step S26, the CPU 44 sets the tool coordinate system $C_T$ as illustrated in FIG. 14.

Then, the CPU 44 arranges the end effector 36 at the position and orientation defined by the tool coordinate system $C_T$, and adsorbs the front surface of the molded article by the adsorption surface 36a of the end effector 36. Then, the CPU 44 operates the robot 14 so as to remove the molded article held by the end effector 36 from the mold 22.

Here, the position (removal position) in the molded article where the adsorption surface 36a adsorbs the molded article is corrected in accordance with the displacement amount calculated in step S25. Accordingly, even if the mold 22 is installed in a skewed manner as illustrated in FIG. 8 upon the replacement of the mold 22, it is possible to arrange the end effector 36 at the same position and orientation with respect to the molded article. Therefore, the molded article can be reliably removed.

Figure 14:
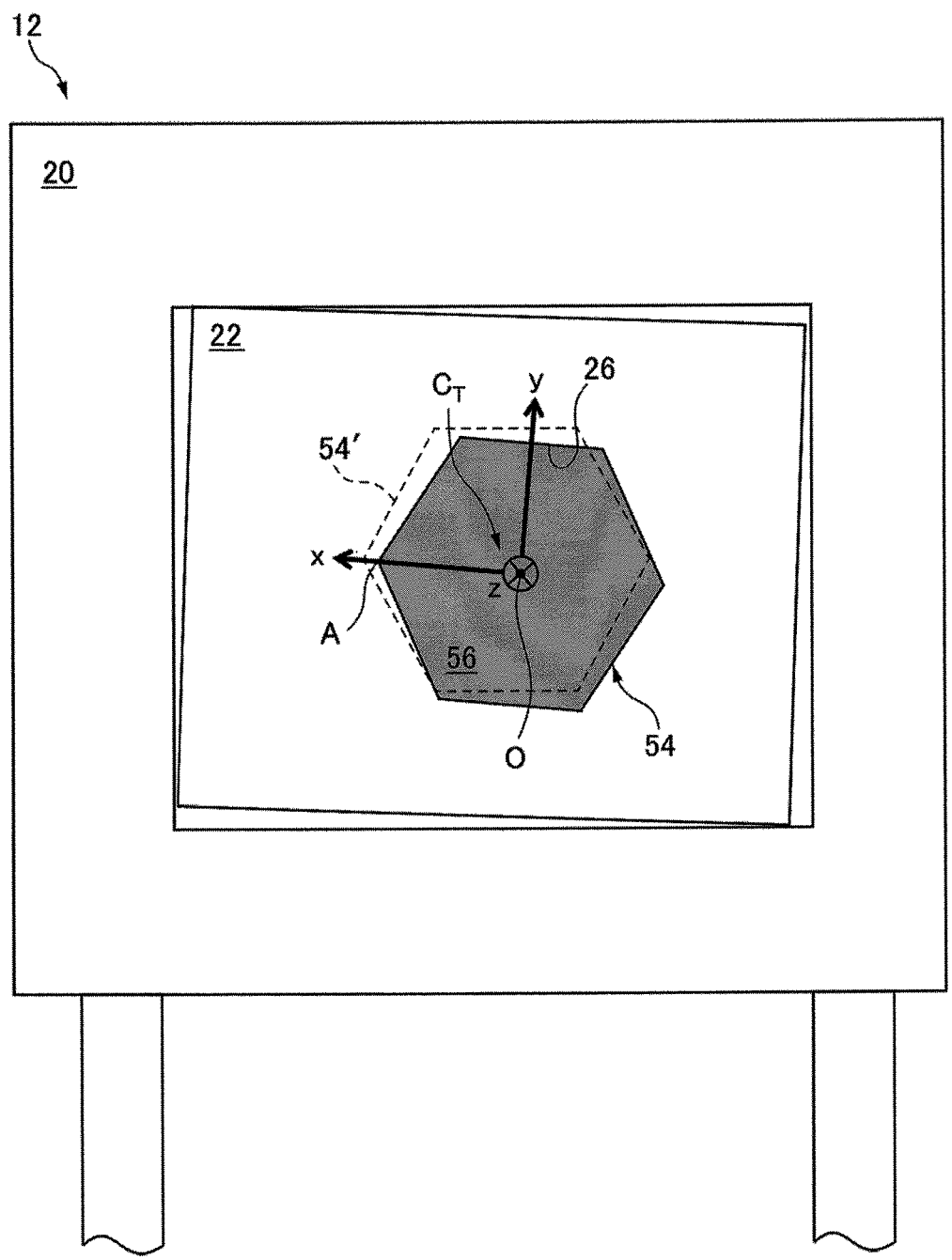
FIG. 14 is a view illustrating an example of a tool coordinate system established in step S33 in FIG. 15.

Alternatively, the CPU 44 arranges the end effector 36 at the position and orientation defined by the tool coordinate system $C_T$ illustrated in FIG. 14, and inserts the insert part gripped by the gripper provided at the end effector 36 at the insertion position formed in the molded article.

Here, the insertion position where the end effector 36 inserts the insert part into the molded article is corrected in accordance with the displacement amount calculated in step S25. Accordingly, even if the mold 22 is installed in a skewed manner as illustrated in FIG. 8 upon the replacement of the mold 22, it is possible to arrange the end effector 36 at the same position and orientation with respect to the molded article. Therefore, the insert part can be reliably inserted at the given insertion position.

As another example, if the robot program is corrected so as to move the end effector 36 in the above-mentioned step S26, the CPU 44 sets the tool coordinate system $C_T$ as illustrated in FIG. 11, and arranges the end effector 36 at the position and orientation defined by the tool coordinate system $C_T$.

Then, the CPU 44 operates the robot 14 so as to move the end effector 36 by the vector V ($-x_1$, $-y_1$) in the x-y plane of the tool coordinate system $C_T$ and rotate the end effector 36 about the z-axis by the angle θ in the direction of the arrow E in FIG. 11.

Thereby, since the work position where the end effector 36 works on the molded article in this step S33 can be corrected in accordance with the displacement amount calculated in step S25, it is possible to arrange the end effector 36 at the same position and orientation with respect to the molded article, even if the mold 22 is installed in a skewed manner.

In step S34, the CPU 44 determines whether or not it receives an operation end command from the user, host controller, or molding program. If the CPU 44 determines that it receives the operation end command (i.e. determines YES), the CPU 44 stops the robot 14 and ends the flow illustrated in FIG. 15. On the other hand, if the CPU 44 determines that it does not receive the operation end command (i.e. determines NO), the CPU 44 returns to step S32.

As described above, in this embodiment, the CPU 44 calculates the displacement amount (vector V, angle θ) between the reference position measured when the master work 54 installed at the suitable position is removed and the detected position measured when the master work 54 installed after the measurement of the reference position is removed (step S25).

Then, on the basis of the calculated displacement amount, CPU 44 corrects the work position (the removal position, the insertion position) where the robot 14 carries out the work (removing the molded article, inserting the insert part) on the molded article in step S33 (step S26).

According to this configuration, it is possible to automatically correct the work position of the robot 14 in accordance with the displacement amount from the suitable position of the mold 22, without repeatedly teaching the robot 14 the operation of step S33 each time the mold 22 is installed in the mold installation portion 20. Therefore, it is possible to cause the robot 14 to carry out the work on the work position with high accuracy.

Further, according to this embodiment, since the work position of the robot 14 can be corrected with the measurement section 16 and the robot 14 which functions as the molded article removal device, the configuration of the molding system 10 can be made compact.

Furthermore, if an existing mold is used, it is not necessary to machine the mold for correcting the work position. Further, since the measurement section 16 is arranged outside of the mold, this embodiment can be used for a mold in which sufficient space for the focal point of the measurement section 16 cannot be taken.

Figure 16:
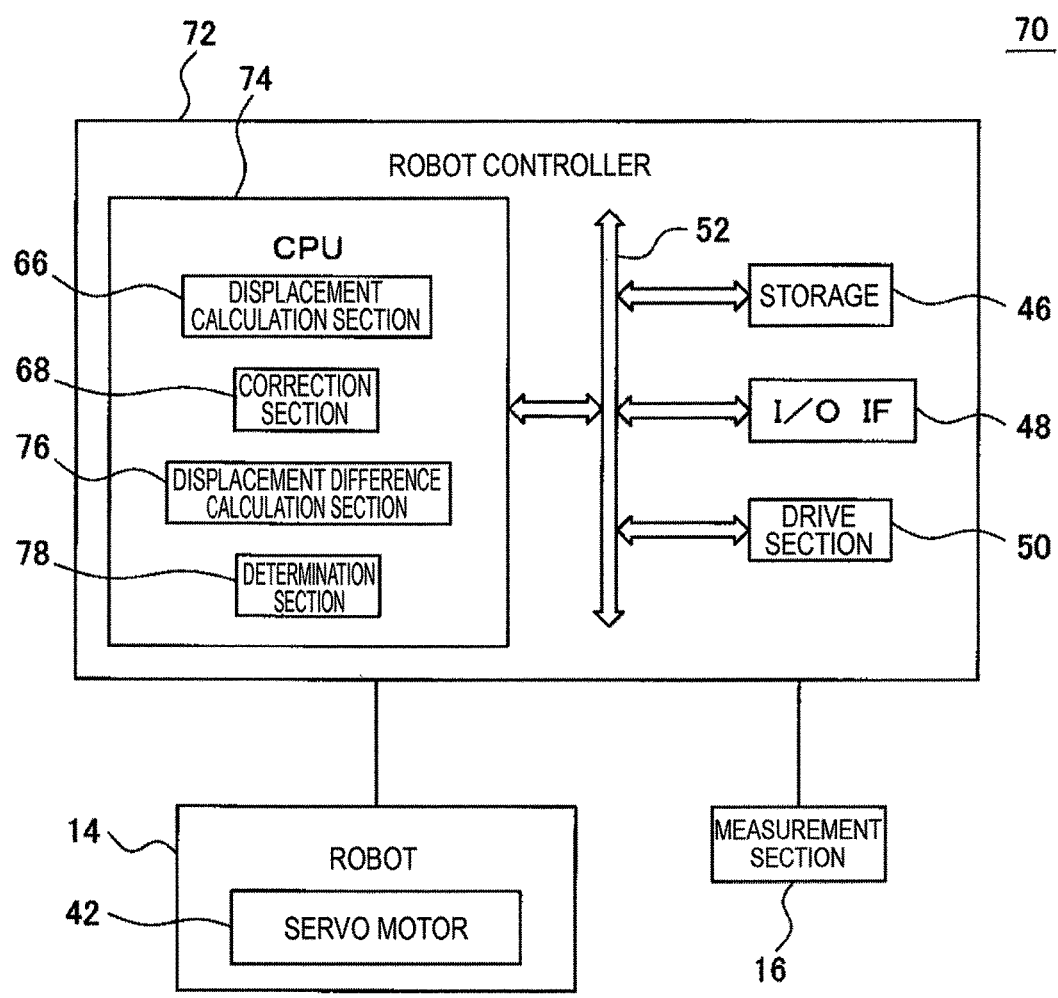
FIG. 16 is a block diagram of a molding system according to another embodiment.

Next, a molding system 70 according to another embodiment will be described below with reference to FIGS. 1 and 16. The molding system 70 includes the molding machine 12, the robot 14, the measurement section 16, and a robot controller 72. The robot controller 72 includes a CPU 74, the storage 46, the I/O interface 48, and the drive section 50.

Similarly to the above-mentioned CPU 44, the CPU 74 is communicably connected to the storage 46, the I/O interface 48, and the drive section 50 via the bus 52. The CPU 44 carries out the various processes described below while communicating with these components.

Next, the operation of the molding system 70 will be described with reference to FIG. 17. At first, the molding system 70 executes the reference position measuring flow illustrated in FIG. 3, similarly to the above-mentioned molding system 10. Then, the molding system 70 executes the work position correction operation illustrated in FIG. 17.

Figure 17:
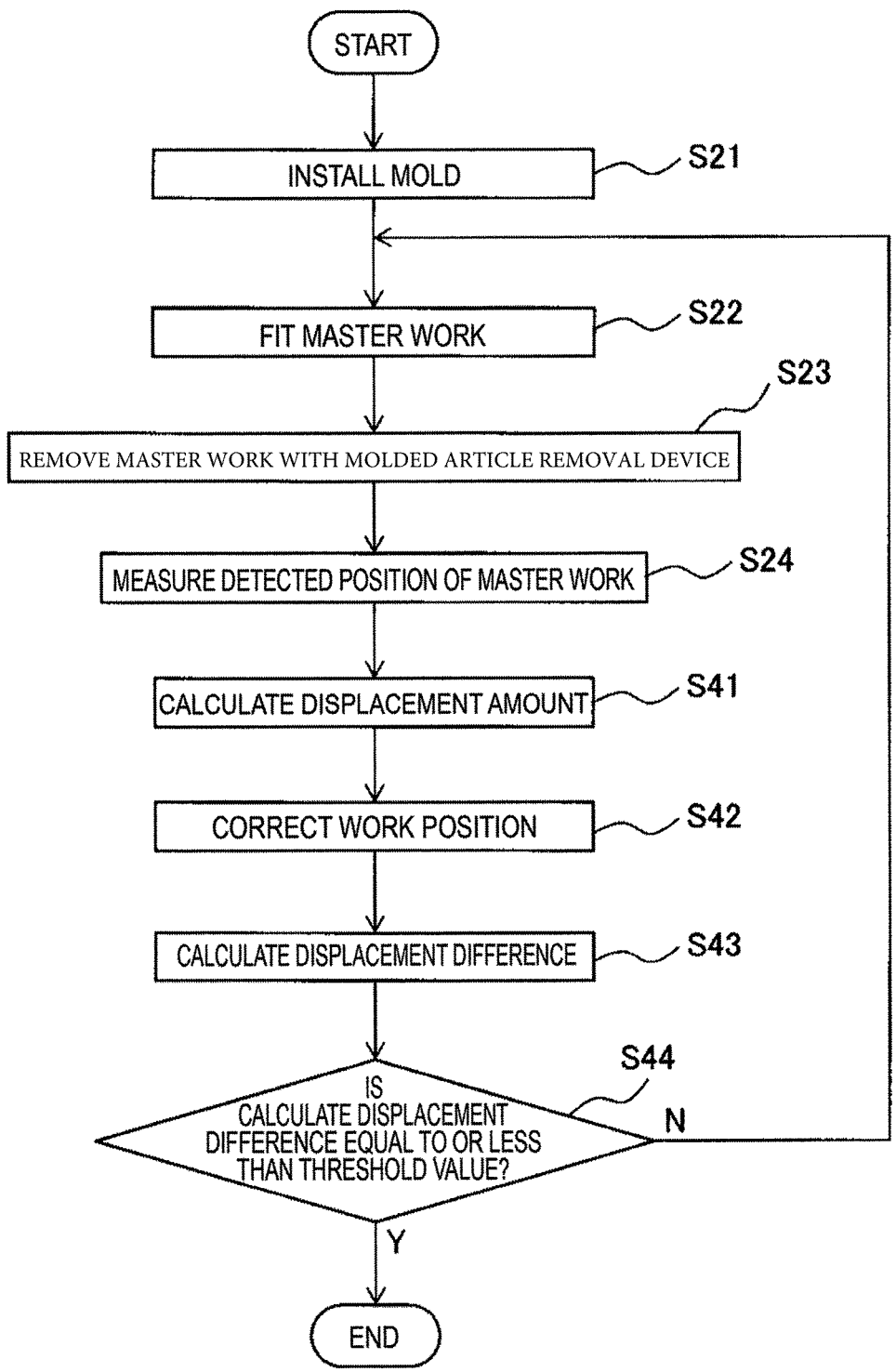
FIG. 17 is a flowchart illustrating an example of an operation flow of the molding system illustrated in FIG. 16.

Note that, in the flow illustrated in FIG. 17, processes similar to those in the flow illustrated in FIG. 3 are assigned the same step number, and repetitive descriptions thereof will be omitted. The flow illustrated in FIG. 17 is started after the flow illustrated in FIG. 3 is ended and the mold 22 illustrated in FIG. 1 is replaced.

Here, in the flow illustrated in FIG. 17, a loop of steps S22 to S44 is repeated until it is determined YES in step S44 described below. Below, the execution of the n-th time of loop will be described below.

After the n-th time of steps S22 and S23 is executed, in step S41, the CPU 74 functions as the displacement calculation section 66 (FIG. 16) so as to calculate the displacement amount.

Specifically, by the method similar to the above-mentioned embodiment, the CPU 74 calculate the vector $V_n$ ($x_n$, $y_n$) and the angle $\theta_n$ as the displacement amount, from the reference position included in the image (e.g., image 62) obtained in the above-mentioned step S4 and the detected position included in the image (e.g., image 64) obtained in step S24 of the n-th time.

Additionally, the CPU 44 calculates the distance $\delta_n=(x_n^2+y_n^2)^{1/2}$ between the reference position and the detected position from the calculated vector $V_n$ ($x_n$, $y_n$). The CPU 74 stores the calculated vector $V_n$ ($x_n$, $y_n$), angle $\theta_n$, and distance $\delta_n$ in the storage 46.

In step S42, the CPU 74 functioning as the correction section 68 (FIG. 16) so as to correct the work position where the robot 14 works on the molded article in step S33, on the basis of the displacement amount calculated in the most-recent step S41, in a similar manner to step S26 described above.

In step S43, the CPU 74 calculates a displacement difference. Specifically, the CPU 74 reads out from the storage 46 the distance $\delta_{n-1}=(x_{n-1}^2+y_{n-1}^2)^{1/2}$ stored in step S41 executed the (n−1)-th time and the distance $\delta_n=(x_n^2+y_n^2)^{1/2}$ stored in step S41 executed the n-th time.

Then, the CPU 74 calculates the difference $\Delta_n$ between the distance $\delta_{n-1}$ and the distance $\Delta_n$ as the displacement difference $\Delta_n$ (i.e., $\Delta_n=|\delta_n-\delta_{n-1}|=|(x_n^2+y_n^2)^{1/2}-(x_{n-1}^2+y_{n-1}^2)^{1/2}|$). Thus, in this embodiment, the CPU 74 functions as a displacement difference calculation section 76 (FIG. 16) configured to calculate the displacement difference $\Delta_n$.

In step S44, the CPU 74 determines whether or not the displacement difference $\Delta_n$ calculated in the most-recent step S43 is equal to or less than a predetermined threshold value $\alpha$ ($\Delta_n \leq \alpha$). The threshold value $\alpha$ is predetermined for the displacement difference $\Delta_n$, and stored in the storage 46.

If the displacement difference $\Delta_n$ calculated in the most-recent step S43 is equal to or less than the predetermined threshold value $\alpha$ ($\Delta_n \leq \alpha$), the CPU 74 determines YES, and ends the flow illustrated in FIG. 17. On the other hand, if the displacement difference $\Delta_n$ is greater than the threshold value $\alpha$ ($\Delta_n > \alpha$), the CPU 74 determines NO, and returns to step S22.

Thus, in this embodiment, the CPU 74 functions as a determination section 78 (FIG. 16) configured to determine whether or not the displacement difference $\Delta_n$ is equal to or less than the predetermined threshold value $\alpha$. After the execution of the flow illustrated in FIG. 17, the CPU 74 carries out the flow illustrated in FIG. 15, similarly to the above-mentioned embodiment.

As stated above, in this embodiment, the CPU 74 repeats a loop of steps S22 to S44 until the displacement difference $\Delta_n$ calculated in step S43 is equal to or less than the predetermined threshold value $\alpha$. The technical significance of this operation will be described below.

A molded article, which has a curved front surface that faces the outside of the mold 22, may be molded. In this case, the front surface 56 of the master work 54 corresponding to such a molded article is also a curved surface. If the end effector 36 of the robot 14 adsorbs thus-curved front surface 56 of the master work 54, the position where the end effector 36 adsorbs the front surface 56 may change due to the curved shape of the front surface 56, each time step S23 in FIG. 17 is repeatedly carried out.

By such a change in the adsorption position, an error due to the curved shape of the front surface 56 may be included in the displacement amount calculated in step S41.

As a result of thorough research, the inventors discovered that such an error can be gradually reduced by repeatedly carry out a series of operations of removing the master work (step S23), measuring the detected position (step S24), and calculating the displacement (step S41).

In this embodiment, the CPU 74 repeatedly carries out a loop of steps S22 to S44 in FIG. 17, in order to calculate the displacement amount after reducing the above-mentioned error to be within an allowable range.

Thereby, the error in the displacement amount caused by the shape of the molded article can be reduced, and the displacement amount can be calculated with higher accuracy. Accordingly, it is possible to cause the robot 14 to carry out the work on the work position with highly accuracy in step S33, irrespective of the shape of the molded article.

Note that, in the flow illustrated in FIG. 17, when the displacement difference $\Delta_n$ calculated in step S43 is equal to or less than the threshold value $\alpha$, the CPU 74 judges that the error in the displacement amount calculated in step S41 is reduced to be within an allowable range, and ends the flow illustrated in FIG. 17.

However, the CPU 74 may judge that the error in the displacement amount is reduced to be within an allowable range when the number of times the CPU 74 carries out steps S22 to S42 reaches a predetermined number.

Below, an alternative example of the work position correction operation illustrated in FIG. 17 will be described with reference to FIG. 18. In the flow of the work position correction operation illustrated in FIG. 18, the CPU 74 repeatedly carries out a loop of steps S22 to S52 until it determines YES in step S52 described below. The flow illustrated in FIG. 18 differs from the flow illustrated in FIG. 17 in steps S51 and S52.

After step S42, in step S51, the CPU 74 increments the execution number "n", which indicates the number of times the CPU 74 executes steps S22 to S42, by "1" (i.e., n=n+1).

For example, when the CPU 74 executes the first loop of step S22 to S52, the CPU 74 increments the execution number "n" from "0" to "1" in this step S51. The CPU 74 stores the incremented execution number "n" in the storage 46.

In step S52, the CPU 74 determines whether or not the execution number "n" is greater than a predetermined threshold value β. The threshold value β is predetermined by the user as an integer greater than 1 (e.g., β=10), and stored in the storage 46.

In this step S52, the CPU 74 reads out from the storage 46 the threshold value β and the execution number "n" currently stored in the storage 46. Then, the CPU 74 compares the execution number "n" with the threshold value β, and determines whether or not the execution number "n" is greater than the threshold value β.

Figure 18:
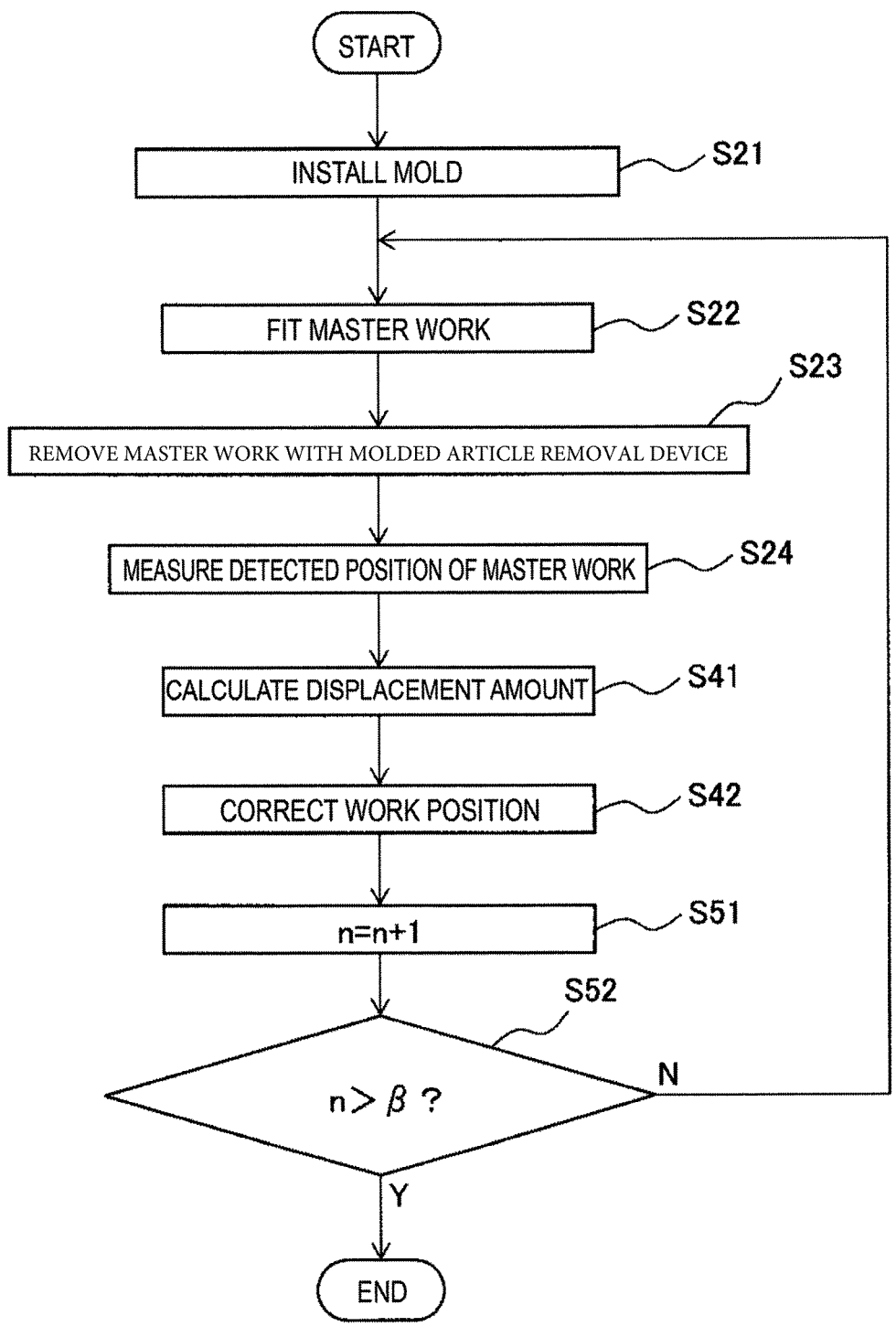
FIG. 18 is a flowchart illustrating an alternative example of the flow illustrated in FIG. 17.

If the execution number "n" is greater than the threshold value β (n>β), the CPU 74 determines YES and ends the flow illustrated in FIG. 18. On the other hand, if the execution number "n" is equal to or less than the threshold value β (n≤β), the CPU 74 determines NO and returns to step S22.

Thus, in the flow illustrated in FIG. 18, the CPU 74 judges that the error in the displacement amount is reduced to be within an allowable range when the number of times a loop of steps S22 to S42 is executed reaches a predetermined number, and ends the work position correction operation.

According to this configuration, similarly to the flow illustrated in FIG. 17, the error in the displacement amount caused by the shape of the molded article can be reduced, and the displacement amount can be calculated with higher accuracy. Accordingly, it is possible to cause the robot 14 to work on the work position with highly accuracy in step S33, irrespective of the shape of the molded article.

Figure 19:
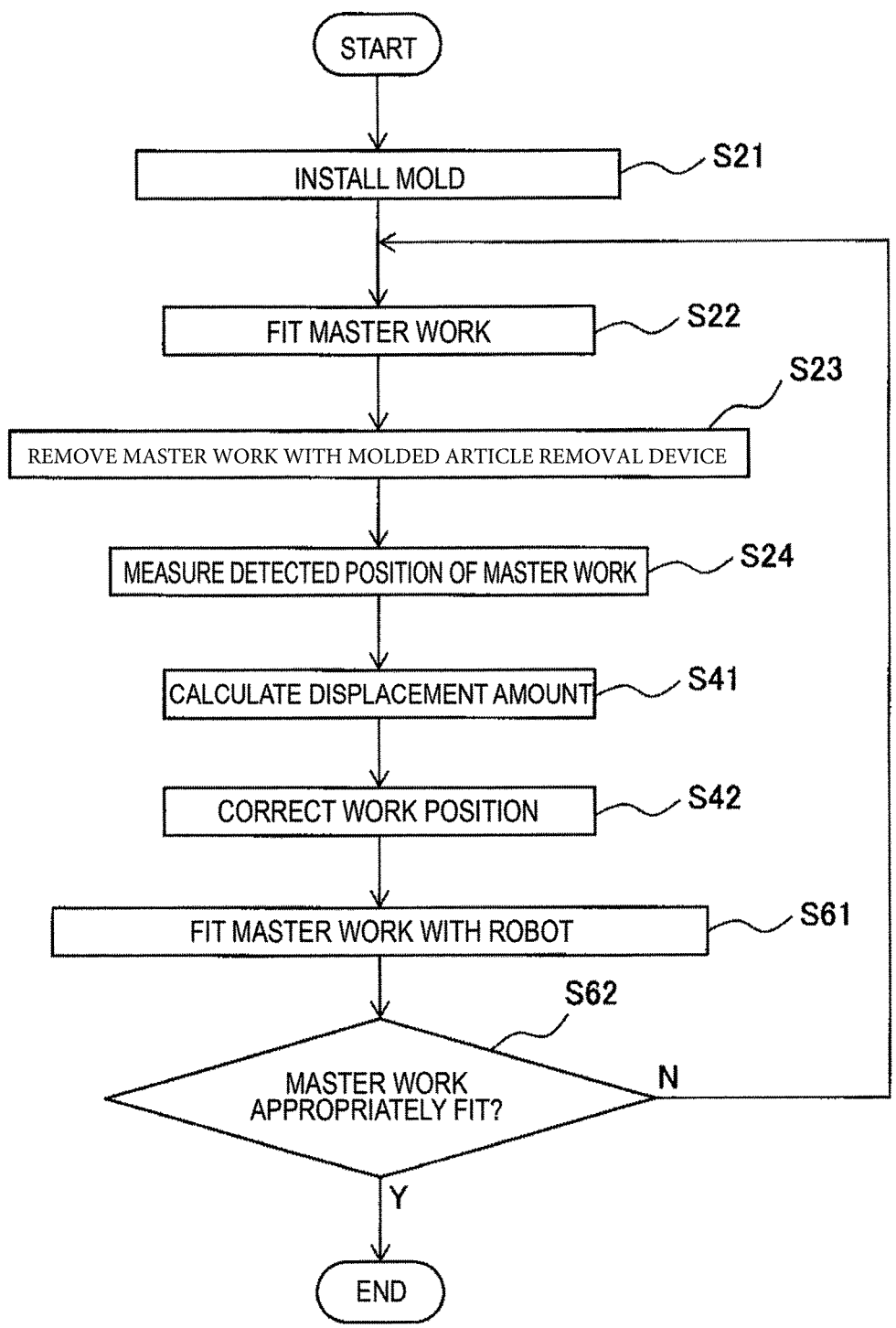
FIG. 19 is a flowchart illustrating another alternative example of the flow illustrated in FIG. 17.

Next, another alternative example of the work position correction operation illustrated in FIG. 17 will be described with reference to FIG. 19. For example, the flow of the work position correction operation illustrated in FIG. 19 is applied to a case where the robot 14 removes the molded article in step S33 shown in FIG. 15.

After step S42, in step S61, the CPU 74 operates the robot 14 so as to fit the master work 54, which has been removed in step S23, into the cavity 26 again.

For example, if the robot program is corrected to change the setting of the tool coordinate system $C_T$ in the above-mentioned step S42, the CPU 74 sets the post-change tool coordinate system $C_T$ (FIG. 14) with respect to the mold installation portion 20.

Next, the CPU 74 sends a command to each servomotor 42 built in the robot 14 via the drive section 50 so as to arrange the end effector 36 at a position and orientation defined by the post-change tool coordinate system $C_T$, and fits the master work 54 into the cavity 26.

In step S62, the CPU 74 determines whether or not the master work 54 is appropriately fit into the cavity 26. If the error in the displacement amount calculated in the most-recent step S41 is sufficiently small, it is possible to appropriately fit the master work 54 into the cavity 26 when carrying out step S61 in accordance with the work position (i.e., the post-change tool coordinate system $C_T$) corrected in step S42.

On the other hand, if the error in the displacement amount calculated in the most-recent step S41 is large, the master work 54 can not be appropriately fit into the cavity 26 even when carrying out step S61 in accordance with the corrected work position (i.e., the post-change tool coordinate system $C_T$).

In the flow illustrated in FIG. 19, in order to determine whether or not the error in the displacement amount calculated in step S41 is reduced to be within an allowable range, the CPU 74 executes step S61 in accordance with the work position corrected in step S42, and determines whether or not the master work 54 is appropriately fit into the cavity 26 in step S62.

As an example, the CPU 74 monitors feedback from each servomotor 42 (e.g., feedback current, load torque, etc.) during the execution of step S61. In this step S62, the CPU 74 determines whether or not the feedback is within a predetermined allowable range.

If the master work 54 can not be appropriately fit into the cavity 26 during the execution of step S61, the master work 54 engages the front surface of the mold 22, thereby the master work 54 can not smoothly be pushed into the cavity 26. In this case, the load torque acting on each servomotor 42 increases, thereby the feedback from each servomotor 42 abnormally fluctuates.

The CPU 74 can determine whether or not the master work 54 is appropriately fit into the cavity 26 during the execution of step S61, by determining whether the feedback from each servomotor 42 is within a predetermined allowable range.

If the feedback is within the allowable range until the end of step S61, the CPU 74 determines YES, and ends the flow illustrated in FIG. 19. On the other hand, if the feedback is out of the allowable range, the CPU 74 determines NO, and returns to step S22. Then, in step S22, the user fits the master work 54 into the cavity 26 of the mold 22. In this way, the CPU 74 repeatedly carries out a loop of steps S22 to S62 until it determines YES in step 62.

Thus, in the flow illustrated in FIG. 19, the CPU 74 operates the robot 14 in accordance with the work position corrected in step S42 so as to fit the master work 54 into the cavity 26. Then, the CPU 74 judges that the error in the displacement amount calculated in step S41 is reduced to be within an allowable range and ends the work position correction operation, when the master work 54 is appropriately fit into the cavity 26.

According to this configuration, similarly to the flow illustrated in FIG. 17, the error in the displacement amount caused by the shape of the molded article can be reduced, thereby the displacement amount can be calculated with higher accuracy. Accordingly, it is possible to cause the robot 14 to carry out the work (i.e., removing the molded article) on the work position in step S33 with highly accuracy, irrespective of the shape of the molded article.

Note that, in step S4 described above, the CPU 44 may analyze the image 62 illustrated in FIG. 7 so as to detect any characteristic point (e.g., the corner A) of the master work 54 in the image 62, and calculate the coordinates $P_R$ ($x_R$, $y_R$) of the tool coordinate system $C_T$ of the detected characteristic point.

In this case, in step S25, the CPU 44 may analyze the image 64 illustrated in FIG. 13 so as to detects a characteristic point (e.g., the corner A) of the master work 54 in the image 64, which corresponds to the characteristic point of the reference position, and calculate the coordinates $P_D$ ($x_D$, $y_D$) of the tool coordinate system $C_T$ of the detected characteristic point.

Then, the CPU 44 may calculate the vector V ($x_R$-$x_D$, $y_R$-$y_D$) from the coordinates $P_R$ to the coordinates $P_D$ as the displacement mount indicative of the difference in the x-y plane between the reference position and the detected position.

Further, in step S25 described above, the CPU 44 may calculate the displacement mount on the basis of a mark or shape provided on the master work 54, instead of the corner A or the imaginary line D.

Figure 20A:
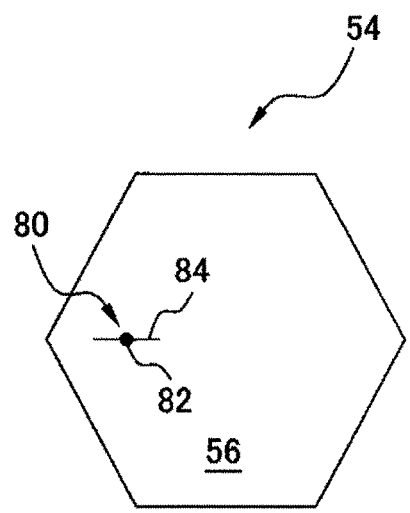
FIG. 20A is a view of a master work according to another embodiment.

Such an embodiment will be described with reference to FIGS. 20A and 20B. In the master work 54 shown in FIG.

20A, a mark 80 is provided on the front surface 56 of the master work 54. The mark 80 includes a point 82 and a straight line 84.

In the above-mentioned step S25, the CPU 44 may detect the point 82 instead of the above-mentioned corner A, and calculate the coordinates P (x, y) of the tool coordinate system $C_T$ of the detected point 82. Further, in the above-mentioned step S25, the CPU 44 may detect the straight line 84 instead of the above-mentioned imaginary lines $D_R$, $D_D$, and calculate the angle θ between the straight line 84 of the reference position and the straight line 84 of the detected position, as the displacement amount.

Figure 20B:
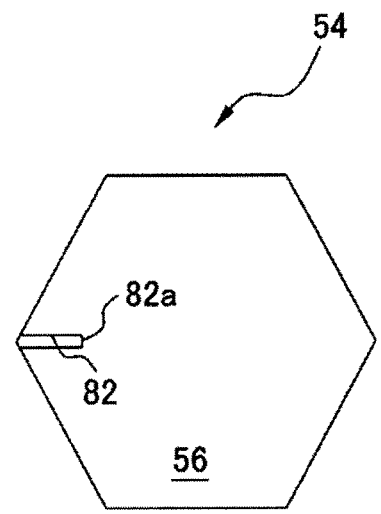
FIG. 20B is a view of a master work according to yet another embodiment.

On the other hand, in the master work 54 illustrated in FIG. 20B, a linear notch 82 is formed on the front surface 56 of the master work 54. In the above-mentioned step S25, the CPU 44 may detect an end 82a of the notch 82 instead of the above-mentioned corner A, and calculate the coordinates P (x, y) of the tool coordinate system $C_T$ of the detected end 82a.

Further, in step S25, the CPU 44 may detect the notch 82 instead of the above-mentioned imaginary lines $D_R$, $D_D$, and calculate the angle θ between the extension direction of the notch 82 of the reference position and the extension direction of the notch 82 of the detected position, as the displacement amount.

Note that, a sensor coordinate system may be set for the measurement section 16, and in step S4 described above, the CPU 44 may detect a characteristic point (e.g., the center or the corner A) of the master work 54 in the image 62 illustrated in FIG. 7, and calculate the coordinates $P_R$ ($x_R$, $y_R$) of the sensor coordinate system of the detected characteristic point.

In this embodiment, in step S25, the CPU 44 analyzes the image 64 illustrated in FIG. 13, detects a characteristic point (e.g., the corner A) of the master work 54 in the image 64, which corresponds to the characteristic point of the reference position, and calculates the coordinates $P_D$ ($x_D$, $y_D$) of the sensor coordinate system of the detected characteristic point.

Then, the CPU 44 may calculate the vector V ($x_R-x_D$, $y_R-y_D$) from the coordinates $P_R$ to the coordinates $P_D$ as the displacement amount indicative of the difference between the reference position and the detected position in the x-y plane of the sensor coordinate system. For example, the sensor coordinate system may be set similarly as the tool coordinate system $C_T$ illustrated in FIG. 7.

Further, the measurement section 16 is not limited to an imaging section, but may include any sensor able to detect the shape of the master work 54, such as a laser displacement sensor. Further, the end effector 36 may be a robot hand including fingers capable of opening and closing.

Further, instead of the robot 14, a loader may be applied so as to constitute the molded article removal device, for example. Further, the cavity 26 and the master work 54 are not limited to a hexagonal prism shape, but may be of any shape.

The invention has been described above using embodiments of the invention. However, the embodiments described above are not intended to limit the scope of the claims of the invention. Combinations of the configurations described in the embodiments of the invention are included in the technical scope of the invention. However, not all such combinations are imperative for solving the problem of the invention. As will be apparent to one skilled in the art, various changes and modifications can be made to the embodiments described above.

Also, it should be understood that the order of execution of the processing including the operations, procedures, steps, processes, and stages of the devices, systems, programs, and methods described in the claims, specification, and drawings may be performed in any order unless "before" or "prior to" and other such expressions are used or the output of a prior process is used in the following process. In describing the operation flow in the claims, specification, and drawings, for convenience, "first", "next", "then", and other such expressions are used; however, this does not mean that the order of execution has to be carried out in such a specific order.

The invention claimed is:

1. A molding system, comprising:
   a molding machine in which a mold is installed;
   a molded article removal device capable of removing a master work attached to the mold;
   a measurement section configured to:
      measure, as a reference position, a position of the master work held by the molded article removal device when the molded article removal device removes the master work attached to a mold installed at a predetermined suitable position with respect to the molding machine and is arranged at a predetermined measurement position; and
      measure, as a detected position, a position of the master work held by the molded article removal device when the molded article removal device removes the master work attached to a mold installed in the molding machine after measuring the reference position and removing the mold installed at the suitable position from the molding machine, and is arranged at the measurement position;
   a displacement calculation section configured to calculate a difference between the reference position and the detected position measured by the measurement section, as a displacement amount; and
   a correction section configured to correct a work position in a molded article molded by the molding machine with the mold installed in the molding machine after measuring the reference position, based on the displacement amount calculated by the displacement calculation section, the work position being a position where the molded article removal device carries out a work on the molded article.

2. The molding system of claim 1, wherein the molded article removal device repeatedly carries out removing the master work attached to the mold, after the measurement section measures the reference position,
   wherein the measurement section measures the detected position each time the molded article removal device removes the master work attached to the mold,
   wherein the displacement calculation section calculates the displacement amount each time the measurement section measures the detected position,
   wherein the molding system further comprising:
      a displacement difference calculation section configured to calculate a displacement difference which is a difference between a first displacement amount calculated by the displacement calculation section and a second displacement amount calculated by the displacement calculation section prior to the first displacement amount; and
      a determination section configured to determine whether the displacement difference calculated by the displacement difference calculation section is equal to or less than a predetermined threshold value.

3. The molding system of claim 1, wherein the correction section corrects a removal position as the work position where the molded article removal device removes the molded article in the mold, based on the displacement amount.

4. The molding system of claim 1, wherein the correction section corrects an insertion position as the work position where the molded article removal device inserts an insert part into the molded article in the mold, based on the displacement amount.

5. The molding system of claim 1, wherein the molded article removal device is a robot.

6. The molding system of claim 1, wherein the measurement section includes an imaging section capable of imaging the master work.

* * * * *